US 6,603,864 B1

(12) United States Patent
Matsunoshita

(10) Patent No.: US 6,603,864 B1
(45) Date of Patent: Aug. 5, 2003

(54) IMAGE PROCESSING APPARATUS AND IMAGE PROCESSING METHOD

(75) Inventor: Junichi Matsunoshita, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/388,358

(22) Filed: Sep. 1, 1999

(30) Foreign Application Priority Data

Oct. 30, 1998 (JP) ............................................. 10-309710

(51) Int. Cl.⁷ ................................................. G06K 9/00
(52) U.S. Cl. ....................................... 382/100; 382/284
(58) Field of Search ................................. 382/100, 166, 382/284, 312, 165, 164, 181, 285, 282, 278, 162, 170, 171, 175, 176, 179, 180, 182; 350/450, 458; 358/450, 540, 3.28

(56) References Cited

U.S. PATENT DOCUMENTS 6,095,566 A * 8/2000 Yamamoto et al. ............ 283/75
6,219,454 B1 * 4/2001 Kawano et al. ............. 382/319
6,337,930 B1 * 1/2002 Owada et al. ............... 382/284

FOREIGN PATENT DOCUMENTS

| JP | 60-180171 | 11/1985 |
| JP | 9-509795 | 9/1997 |
| JP | 10-51650 | 2/1998 |
| JP | 10-290312 | 10/1998 |

* cited by examiner

Primary Examiner—Bhavesh M. Mehta
Assistant Examiner—Seyed Azarian
(74) Attorney, Agent, or Firm—Morgan, Lewis & Bockius LLP

(57) ABSTRACT

If additional data is embedded in electronic image data with a low embedding strength such that images based on the image data are displayed without degradation of image quality, the additional data could not be extracted from printed images. An image processing apparatus that processes electronic image data to which additional data representing additional information such as copyright ID information is appended is provided with an additional data recognition unit for recognizing that first additional data representing additional information is appended to image data from which to form images, and an additional data embedding unit, when it is recognized by the additional data recognition unit that the first additional data is appended, for embedding second additional data representing additional information in the image data, wherein the additional information is extractable from formed images.

29 Claims, 21 Drawing Sheets

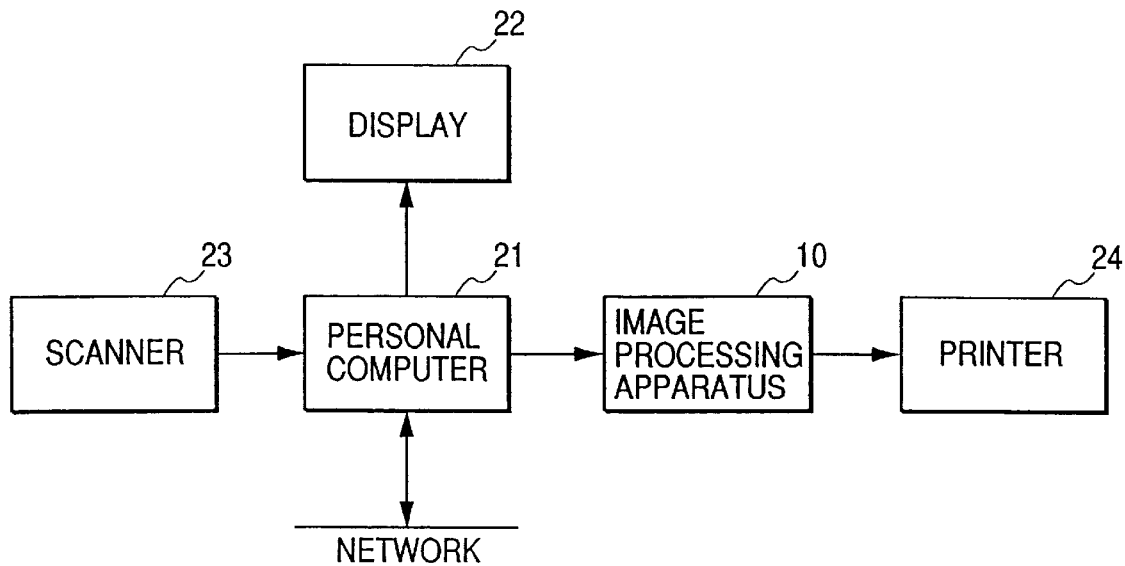
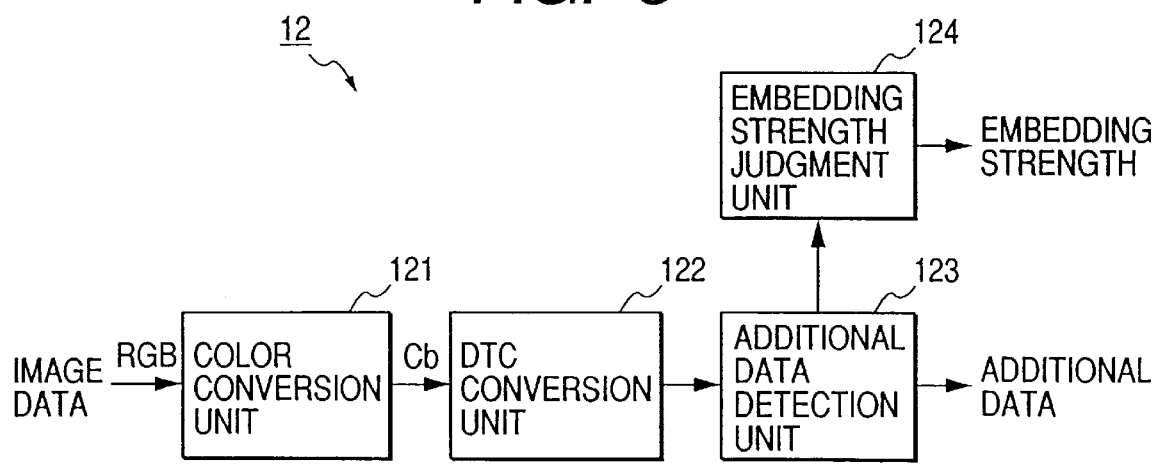

FIG. 13A

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | −a | +b | 0 | 0 | 0 | 0 | 0 | 0 | 0 | 0 | 0 |
| 0 | 0 | 0 | 0 | 0 | 0 | −a | +b | 0 | 0 | 0 | 0 | 0 | 0 | 0 | 0 |
| 0 | 0 | 0 | 0 | 0 | 0 | 0 | −a | +b | 0 | 0 | 0 | 0 | 0 | 0 | 0 |
| 0 | 0 | 0 | 0 | 0 | 0 | 0 | 0 | −a | +b | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

FIG. 13B

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | −a | +b | 0 | 0 | 0 | 0 | 0 | 0 |
| 0 | 0 | 0 | 0 | 0 | 0 | 0 | −a | +b | 0 | 0 | 0 | 0 | 0 | 0 | 0 |
| 0 | 0 | 0 | 0 | 0 | 0 | −a | +b | 0 | 0 | 0 | 0 | 0 | 0 | 0 | 0 |
| 0 | 0 | 0 | 0 | 0 | −a | +b | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

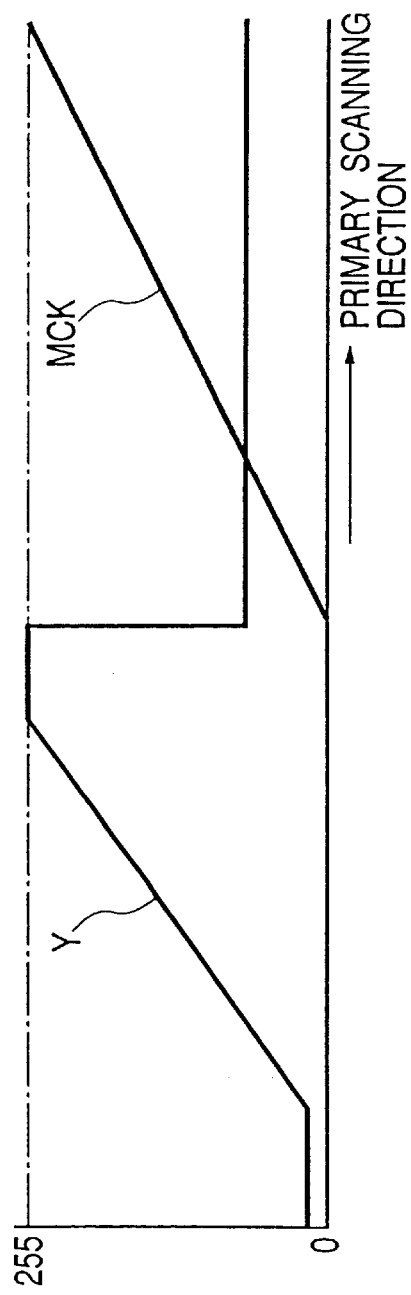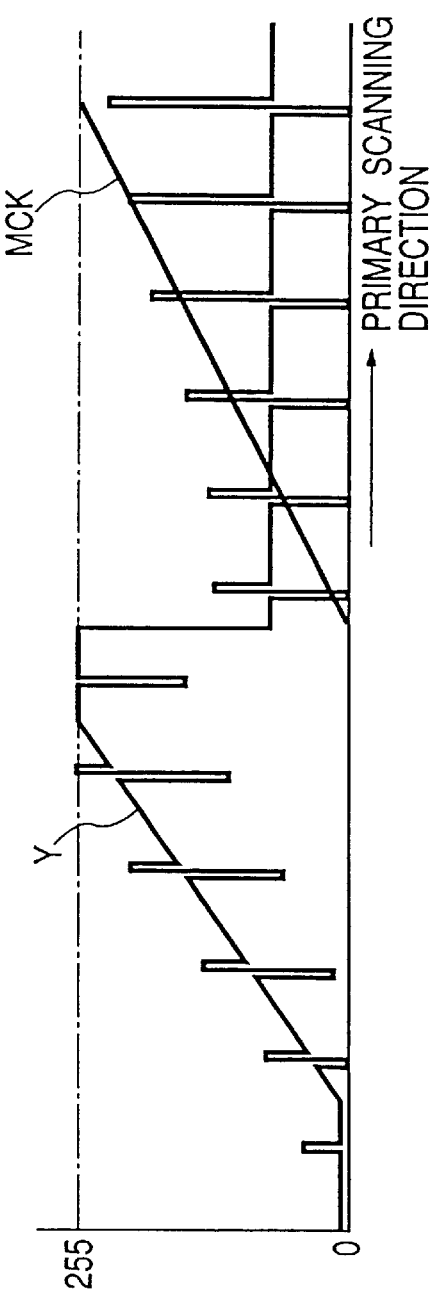

FIG. 17A

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 1 | 1 | 0 | 0 | 0 | 0 | 0 | 0 | 0 | 0 |
| 0 | 0 | 0 | 0 | 0 | 0 | 1 | 1 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 |
| 0 | 0 | 0 | 0 | 0 | 0 | 0 | 0 | 1 | 1 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

FIG. 17B

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 1 | 0 | 0 | 0 | 0 | 0 | 0 |
| 0 | 0 | 0 | 0 | 0 | 0 | 1 | 1 | 0 | 0 | 0 | 0 | 0 | 0 | 0 |
| 0 | 0 | 0 | 0 | 0 | 1 | 1 | 0 | 0 | 0 | 0 | 0 | 0 | 0 | 0 |
| 0 | 0 | 0 | 0 | 1 | 1 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

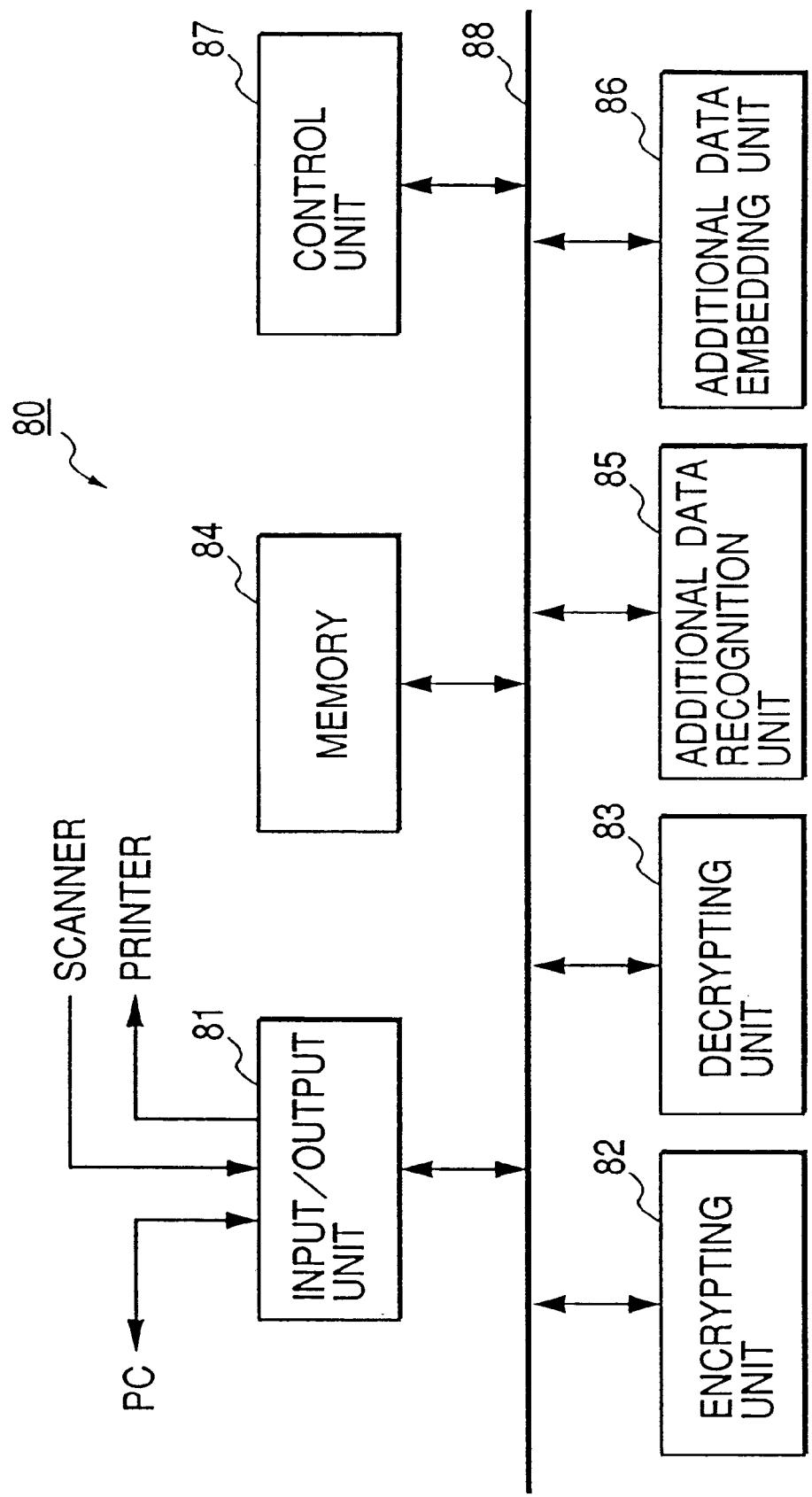

IMAGE PROCESSING APPARATUS AND IMAGE PROCESSING METHOD

BACKGROUND OF THE INVENTION

1. Field of the Invention

The present invention relates to an image processing apparatus and an image processing method for processing digital image data, and particularly to an image processing apparatus and an image processing method for processing digital image data to which additional data such as a copyright ID and user ID are appended.

2. Description of the Related Art

An additional data embedding technique is used to embed additional information in digital image data in superimposed form. Recently, there is a brisk movement to utilize the additional data embedding technique for the purpose of copyright protection of digital products such as still image data and the like, or prevention from illegal duplication thereof. Also, there is another tendency to utilize the additional data embedding technique for the purpose of integrating specific electronic image data and other digital image data related thereto, or private communications.

When the additional data embedding technique is used for the purposes described above, image data should be distributed after embedding additional data such as a copyright ID, user ID, or any identification data in the image data such that it is visually inconspicuous. There are several known techniques for embedding such additional data. Examples include a technique of embedding additional data by superimposing noise signals representing additional data in image data (refer to Japanese Published Unexamined Patent Application No. Hei 9-509795), and a technique of embedding additional data by subjecting image data to Fourier transform and manipulating conversion coefficients of concentric areas indicating identical frequencies on a frequency space (refer to Japanese Published Unexamined Patent Application No. Hei 10-51650).

These additional data embedding techniques are primarily used to prevent electronic illegal duplication or illegal use of electronic image data. Therefore, additional data is embedded in image data such that images based on the electronic image data are displayed on a display without degradation of image quality. Consequently, once electronic image data has been printed by a printer, it is difficult to detect additional data embedded in the image data from images formed on paper after printing.

Accordingly, even if additional data is embedded in electronic image data, since the additional data cannot be recognized from printed images, the printed images might be duplicated and distributed. This results in infringement on the copyright of the creator of the electronic image data. In order that additional data can be recognized from printed images, it is conceivable to embed the additional data in electronic image data to be distributed with a higher embedding strength. In this case, however, there is a problem in that the electronic image data could be displayed on a display with great degradation of image quality.

On the other hand, as a related art of embedding additional data in printed images, there is disclosed in Japanese Published Unexamined Patent Application No. Hei 6-113107 a technique of embedding additional data in printed images by superimposing patterns having positive and negative amplitudes in images in yellow ink.

There is disclosed in Japanese Published Unexamined Patent Application No. Hei 10-290312 a technique by which, when watermark data embedded in digital image data is detected, watermark data accumulated in a watermark data detection unit is multiplied by a constant to almost the same degree as a dynamic range of the image data and the result is added to the image data to be restored, which is sent to a printing unit.

However, if this technique is applied, as described in Japanese Published Unexamined Patent Application No. Hei 10-290312, images wholly different from the original images may be output from the printing unit. Accordingly, there arises a problem that the quality of printed images is heavily degraded. This poses a great problem in an attempt to sell images to users and give the users permission to print out them with high quality.

SUMMARY OF THE INVENTION

The present invention has been made in consideration of the above-described problems and its object is to provide an image processing apparatus and an image processing method which enable additional data to be embedded in electronic image data such that it can be detected without failure from printed images without degradation of image quality.

An image processing apparatus according to the present invention comprises: an additional data recognition part for recognizing that first additional data representing additional information is appended to image data from which to form images; and an appending part, when it is recognized by the additional data recognition part that the first additional data is appended, for appending second additional data representing additional information to the image data, wherein the additional information is extractable from formed images.

In the image processing apparatus having the above-described configuration, an additional data recognition part gets image data from which to form images, and determines whether or not first additional data representing additional information such as copyright ID information is appended to the image data. If the additional data recognition part recognizes that the first additional data is appended, the appending part receives the recognition result and appends second additional data representing additional information extractable from formed images to the image data to output the image data.

Since the present invention appends as additional data, to image data, second additional that is unrecognizable to human eyes from formed images, the above-described problem of Japanese Published Unexamined Patent Application No. Hei 10-290312 is solved.

BRIEF DESCRIPTION OF THE DRAWINGS

FIG. 2 is a block diagram showing the configuration of a system that uses an image processing apparatus according to a first embodiment.

FIG. 3 is a block diagram showing a specific configuration of an additional data recognition unit.

FIGS. 13A and 13B show an example of patterns S0 and S1 used to change embedding strength.

FIGS. 14A and 14B are diagrams for explaining patterns reembedded in image data in a pattern type additional data embedding unit.

FIGS. 17A and 17B are diagrams showing an example of patterns S0 and S1 used during pattern matching.

FIG. 25 is a block diagram showing the configuration of an image processing apparatus according to a fourth embodiment of the present invention.

DESCRIPTION OF THE PREFERRED EMBODIMENTS

Figure 1:
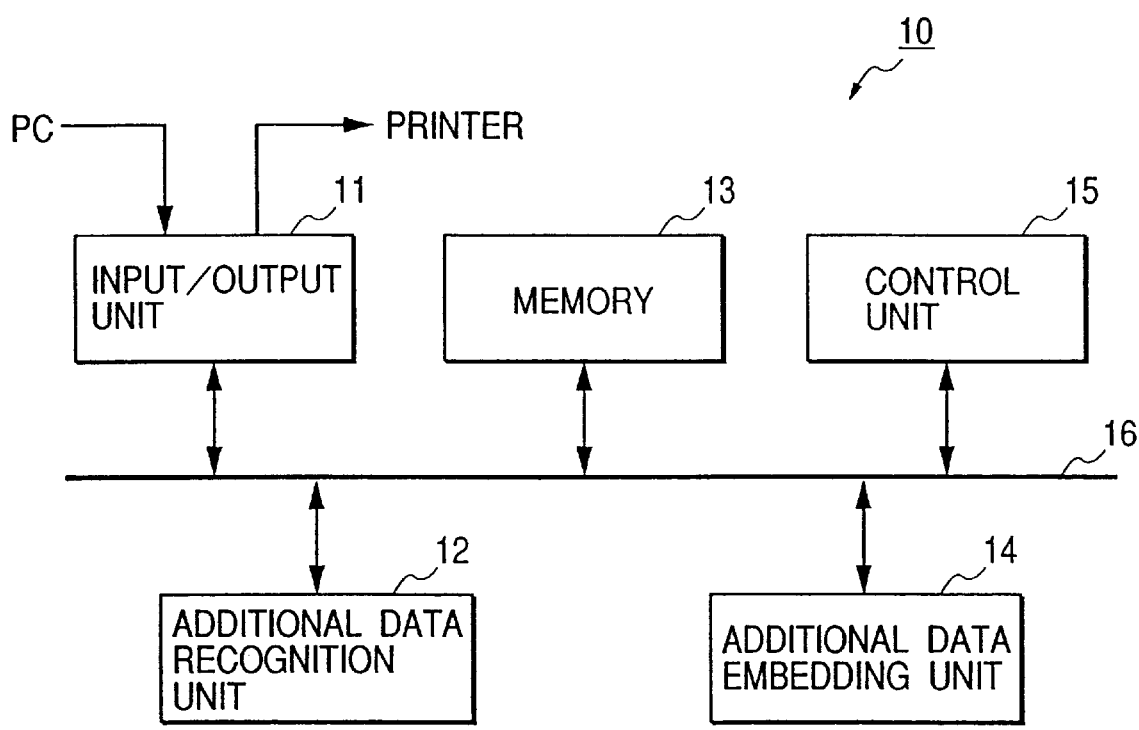
FIG. 1 is a block diagram showing the configuration of an image processing apparatus according to a first embodiment of the present invention.

Hereinafter, embodiments of the present invention will be described in detail with reference to the accompanying drawings. FIG. 1 is a block diagram showing the configuration of an image processing apparatus according to a first embodiment of the present invention.

An image processing apparatus 10 according to the first embodiment comprises: an input/output unit 11 for inputting and outputting image data; an additional data recognition unit 12 for recognizing first additional data embedded in image data by a given embedding method; a memory 13 for storing image data and additional data; an additional data embedding unit 14 for embedding second additional data in image data by the same method for the first additional data; and a control unit 15 for controlling the overall apparatus, which are mutually connected through a bus line 16. This embodiment defines additional information represented by additional data as copyright ID information for identifying the copyright holder of, e.g., image data or images.

FIG. 2 shows the configuration of a system that uses the image processing apparatus 10 according to the first embodiment. The system comprises: a personal computer 21 connected to a network; a display 22 connected to the personal computer 21; an image processing apparatus 10 to which image data is supplied from the personal computer 21; a scanner 23 for scanning manuscripts to supply image data thereof to the personal computer 21; and a printer 24 for printing image data output from the image processing apparatus 10.

In the system having the above-described configuration, users receive image data via the network, store it inside the personal computer 21, display the image data on the display 22, view the displayed image, and if necessary, send the image data to the printer 24 via the image processing apparatus 10 to print it on paper. At this time, the image processing apparatus 10 performs recognition processing to determine whether the sent image data contains additional data, and modifies embedding strength to again perform processing for embedding additional data.

Next, a description will be made of the operation of the image processing apparatus 10 according to the first embodiment and a specific configuration of major portions thereof. Image data sent from the personal computer (PC) 21 of FIG. 2 is input from the input/output unit 11 and is stored in the memory 13. Upon termination of input of the image data, the control unit 15 directs the additional data recognition unit 12 to recognize additional data. The additional data recognition unit 12 determines whether the input image data contains additional data, and checks the embedding strength.

FIG. 3 shows a specific configuration of the additional data recognition unit 12. The additional data recognition unit 12 comprises a DCT (discrete cosin transform) conversion unit 122, an additional data detection unit 123, and an embedding strength judgment unit 124. To the additional data recognition unit 12, image data is input in units of blocks of 16- by 16-pixel size each.

In the additional data recognition unit 12 having the above-described configuration, the input image data is first subjected to color conversion processing in the color conversion unit 121. The color conversion unit 121 converts the input image data, which is the RGB color space, into color space YCrCb of a brightness color difference system, outputs only Cb color difference components, and affords them to the DCT conversion unit 122. The DCT conversion unit 122 subjects image data of Cb components to DCT conversion processing to output DCT coefficients, and affords them to the additional data detection unit 123.

Figure 4:
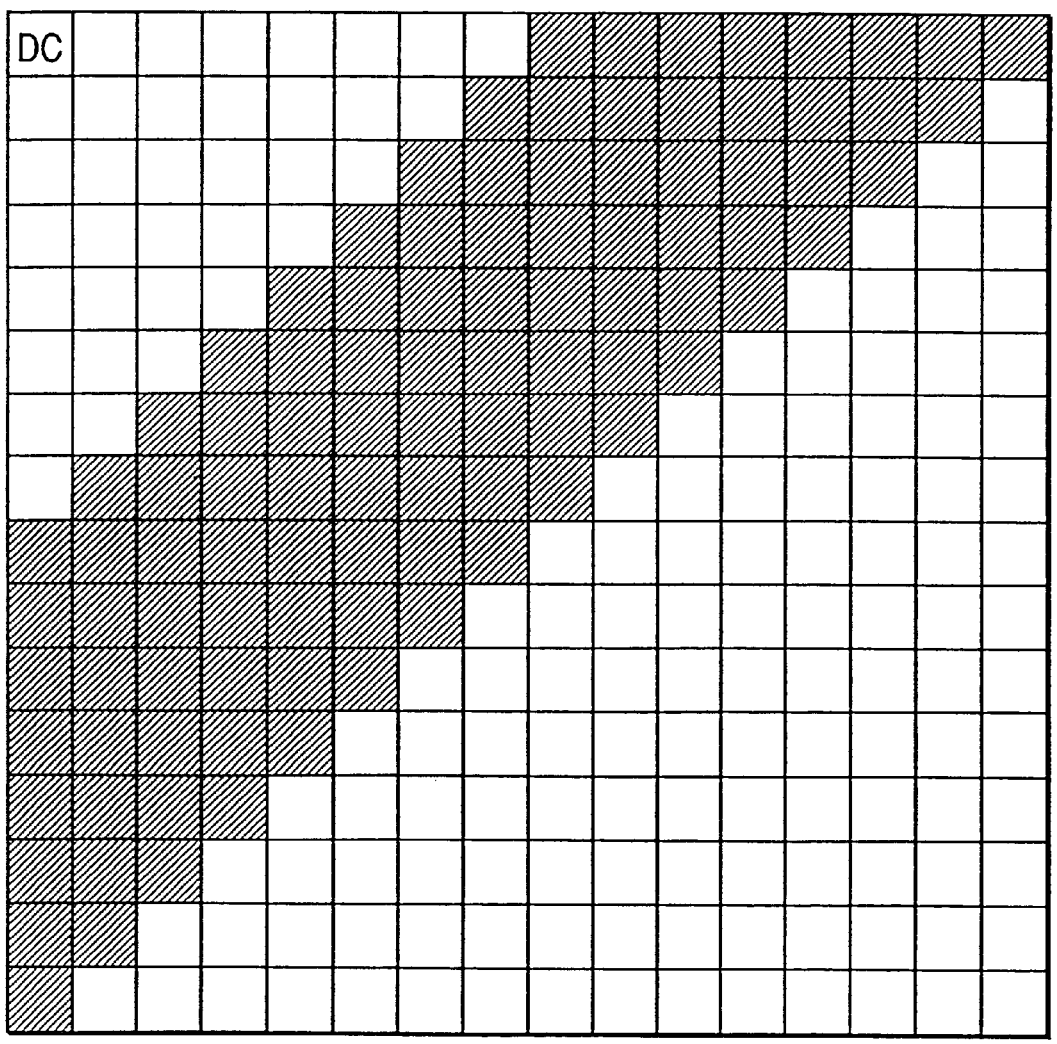
FIG. 4 is a diagram for explaining DCT coefficients.

The additional data detection unit 123 checks specific DCT coefficients. Additional data is embedded in preset specific coefficients of an intermediate frequency area as shown in FIG. 4 to minimize deterioration of the image quality of a formed image. The additional data detection unit 123 finds the absolute value of the specific DCT coefficient and compares it with a preset threshold value TH.

If the absolute value of the DCT coefficient is greater than or equal to the threshold value TH, it is judged that an additional data bit of the value "0" is embedded in the block. Otherwise, it is judged that an additional data bit of the value "1" is embedded in the block. Then, the detected additional data is output. The detected additional data is sequentially stored in an additional data storage area on the memory 13.

The additional data detection unit 123 further finds a difference between the coefficient value and the threshold value TH and affords the difference to the embedding stress judgment unit 124. This process is repeated for all blocks of the entire image. The embedding strength judgment unit 124 finds the average of differences between embedded coefficient values of all blocks and the threshold value TH and outputs it to the control unit 15 as an embedding strength. An embedding strength of additional data denotes the magnitude of the amount of operations on image data during embedding of the additional data.

Upon termination of recognition processing for additional data by the additional data recognition unit 12, the control unit 15 reads additional data stored in the memory 13. If the first 16 bits of additional data detected in the additional data detection unit 123 are a preset specific bit string, the control unit 15 judges that the detected additional data is copyright ID information in which a valid copyright holder is embedded.

In this case, the control unit 15 checks embedding strength judged in the embedding strength judgment unit 124, and if the embedding strength is smaller than a preset threshold value, judges that the embedding strength is so poor that the embedded additional data could not be detected from an image printed by the printer 24. The control unit 15 directs the additional data embedding unit 14 to increase the embedding strength of additional data detected in the additional data detection unit 123.

On the other hand, if the embedding strength is greater than or equal to the threshold value or the first 16 bits of the detected additional data are not a specific bit string, the control unit 15 reads image data stored in the memory 13 and outputs it to the printer 24 via the input/output unit 11 for printing on paper.

Figure 5:
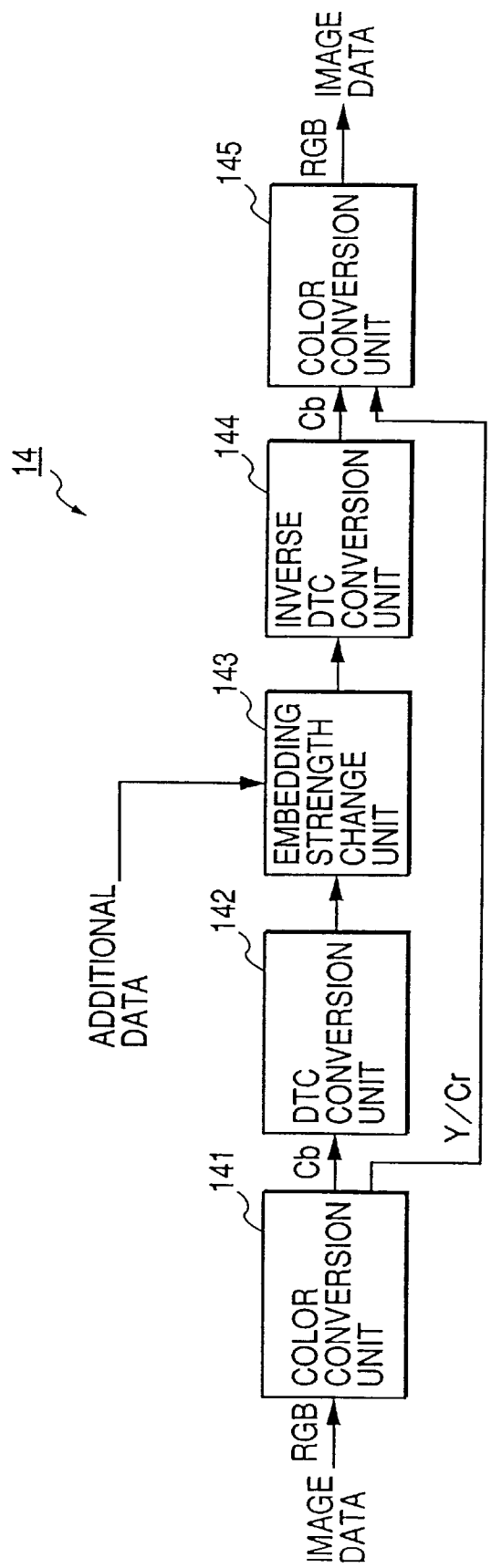
FIG. 5 shows a specific configuration of an additional data embedding unit.

FIG. 5 shows a specific configuration of the additional data embedding unit 14. The additional data embedding unit 14 comprises a color conversion unit 141, a DCT conversion unit 142, an embedding strength change unit 143, an inverse DCT conversion unit 144, and a color conversion unit 145. To the additional data embedding unit 14, image data of RGB color space is input in units of blocks of 16- by 16-pixel size each.

Image data read from the memory 13 is first input to the color conversion unit 141 and is converted into the color space YCrCb of a brightness color difference system from the RGB color space in the color conversion unit 141, and only image data of a color difference component Cb is supplied to the DCT conversion unit 142. The DCT conversion unit 142 subjects image data of the Cb component to DCT conversion processing and affords an output DCT coefficient to the embedding strength change unit 143.

The embedding strength change unit 143 selects specific coefficients from an intermediate frequency area as shown in FIG. 4, and multiplies the coefficient values by either of two preset strength coefficients Va and Vb, depending on an additional data bit read on a bit basis from the additional data storage area on the memory 13, thereby enhancing the embedding strength of the additional data.

At this time, if the value of the additional data bit is "0", the embedding strength coefficient value Va is multiplied, and if the value of the additional data bit is "1", the embedding strength coefficient value Vb is multiplied. The embedding strength coefficient value Va is set to a value of 1.0 or greater and the embedding strength coefficient Vb is set to a value of less than 1.0.

The absolute value of a specific DCT coefficient value of a block with the value of "1", in an additional data bit will be converted into a coefficient value further greater than the original coefficient value, which is greater than the threshold value TH. The absolute value of a specific DCT coefficient value of a block with the value of "0" in an additional data bit will be converted into a coefficient value further smaller than the original coefficient value, which is smaller than the threshold value TH. This ensures that embedded additional data can be detected from images printed on paper by a printer.

The DCT coefficients changed to enhance the embedding strength of the additional data by the embedding strength change unit 143 are input to the inverse DCT conversion unit 144. After the DCT coefficients are returned to the image data Cb by the inverse DCT conversion unit 144, the image data Cb is supplied to the color conversion unit 145. The color conversion unit 145 synthesizes the image data Cb with image data Y/Cr of other color components not subjected to embedding strength change processing for the additional data to return the synthesized image data to the original RGB color space.

The image data output from the additional data embedding unit 14 is stored in the memory 13. The above-described processing is repeated for all blocks. Upon termination of the embedding of additional data, the control unit 15 reads image data changed in embedding strength from the memory 13 and outputs it from the input/output unit 11 to the printer 24 for printing on paper.

Figure 6:
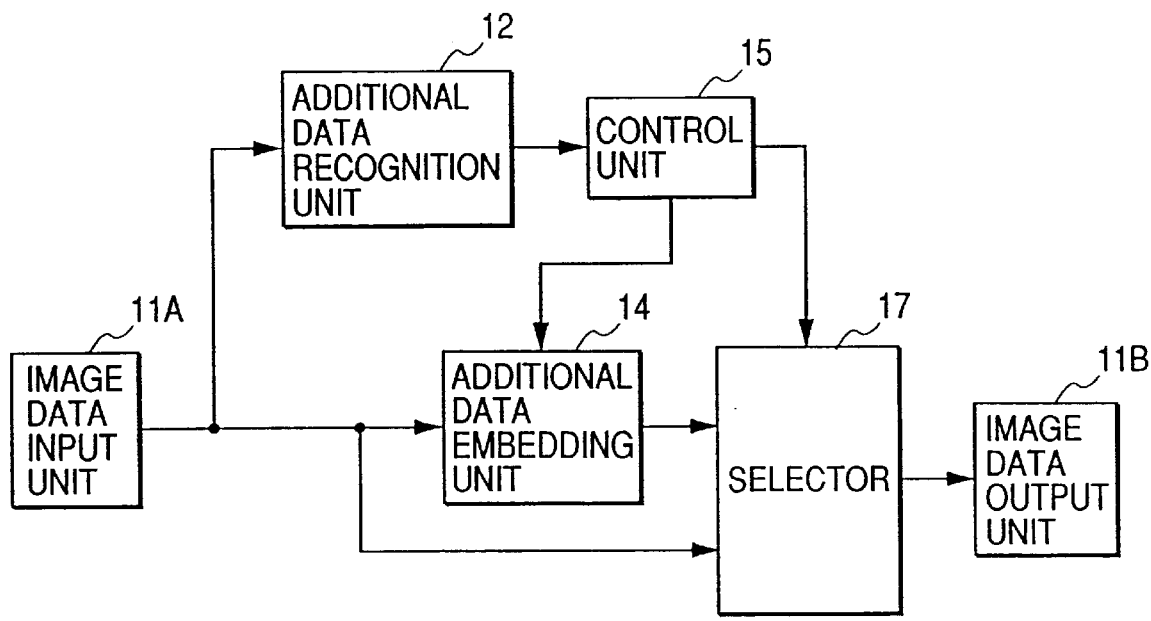
FIG. 6 is a block diagram conceptually showing the functions of an image processing apparatus according to the first embodiment.

FIG. 6 is a block diagram conceptually showing the functions of an image processing apparatus 10 according to the above-described first embodiment. In the figure, portions corresponding to those of FIG. 1 are assigned identical reference numerals. In FIG. 6, the input/output unit 11 of FIG. 1 is divided to an image data input unit 11A and an image data output unit 11B.

In the image processing apparatus 10 according to the first embodiment, the additional data recognition unit 12 determines whether or not additional data (first additional data) is contained in image data from which to form images, input from the image data input unit 11A. If the additional data recognition unit 12 determines that additional data is contained, the control unit 15 receives the recognition result and determines whether or not the additional data is copyright ID information in which a valid copyright holder is embedded.

If the control unit 15 judges that the additional data is copyright ID information in which a valid copyright holder is embedded, it further checks the embedding strength of the additional data. If the embedding strength is smaller than a predetermined threshold value, it judges that copyright ID information represented by the embedded additional data cannot be extracted from an image printed out based on the image data to which the additional data is appended, and directs the additional data embedding unit 14 to append additional data (second additional data) having a higher embedding strength to the image data.

In other words, the predetermined threshold value for an embedding strength serves as a criterion for judging whether or not additional information represented by additional data can be extracted from formed images. Accordingly, the control unit 15 has a function as an extraction judgment part for judging whether or not additional information represented by first additional data can be extracted from formed images.

At the same time as when the control unit 15 directs the additional data embedding unit 14 to append second additional data, it directs the selector 17 to select image data to which the second additional data is appended in the additional data embedding unit 14. On the other hand, when no additional data is recognized in the additional data recognition unit 12, when recognized additional data is not copyright ID information in which a valid copyright holder is contained, or when an embedding strength is greater than or equal to the predetermined threshold value, the control unit 15 directs the selector 17 to select image data input from the image data input unit 11A.

In this way, if additional data recognized in the additional data recognition unit 12 is copyright ID information in which a valid copyright holder is embedded and the embedding strength is smaller than a predetermined threshold value, additional data having a higher embedding strength is appended and output by the additional data embedding unit 14. By this process, even if additional data having as low an embedding strength as would not cause degradation of image quality during displaying on the display 22 is appended to image data, since additional data having a high embedding strength has been appended to the image data before printout, additional information represented by the additional data could be extracted without failure from formed images.

In this embodiment, there are provided a system in which input image data passes through the additional data embedding unit 14, and a system in which it bypasses the additional data embedding unit 14. Thereby, when no additional data is recognized in the additional data recognition unit 12, when recognized additional data is not copyright ID information in which a valid copyright holder is embedded, or when an embedding strength is greater than or equal to a predetermined threshold value (that is, when additional information represented by first additional data can be extracted from formed images), the control unit 15 selects the system for bypassing the additional data embedding unit 14 by the selector 17 to output, without modifications, the image data to which first additional data is appended. However, the present invention is not limited to this configuration.

Figure 7:
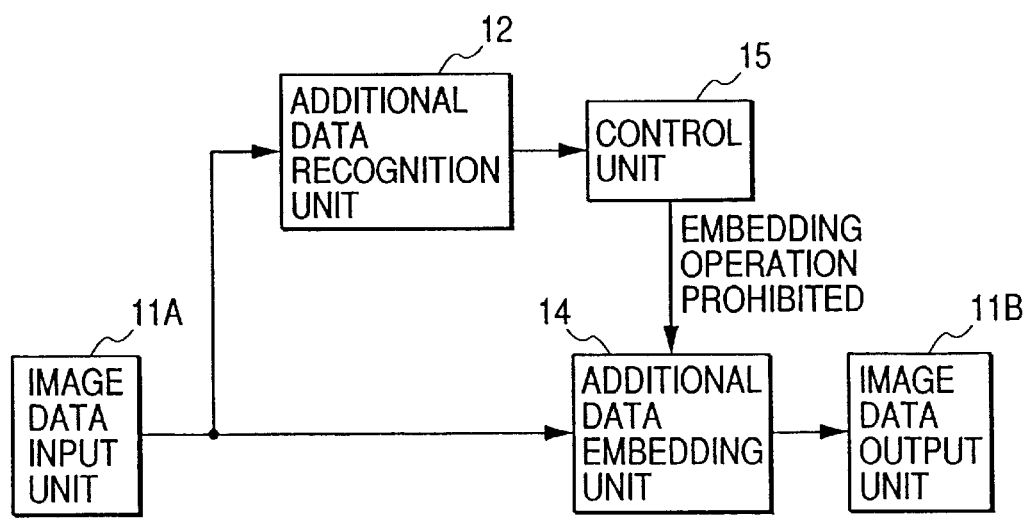
FIG. 7 is a block diagram showing a variation of the first embodiment.

That is, as a variation of the first embodiment, as shown in FIG. 7, only a system in which input data passes through the additional data embedding unit 14 is formed, and when no additional data is recognized in the additional data recognition unit 12, when recognized additional data is not copyright ID information in which a valid copyright holder is contained, or when an embedding strength is greater than or equal to the predetermined threshold value, the control unit 15 prohibits the operation of the additional data embedding unit 14 so as to allow image data provided with first additional data to pass through the additional data embedding unit 14 without modifications, whereby the configuration can be simplified.

Figure 8:
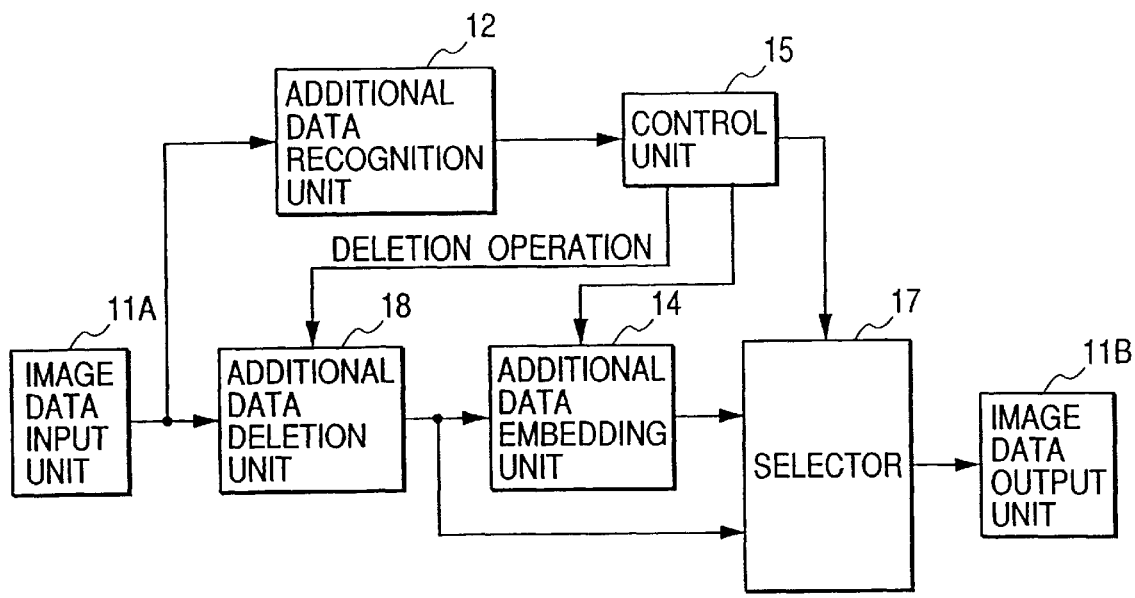
FIG. 8 is a block diagram showing another variation of the first embodiment.

As another variation of the first embodiment, as shown in FIG. 8, an additional data deletion unit 18 for deleting first additional data from input image data is provided, and the control unit 15 is provided with a function as an image quality judgment part for judging whether or not first additional data will deteriorate the quality of formed images. If the control unit 15 judges that first additional data will deteriorate the quality of formed images, the control unit 15 can direct the additional data deletion unit 18 to delete the first additional data from the image data. This will help to prevent deterioration of the quality of formed images, ascribed to the first additional data.

Figure 9:
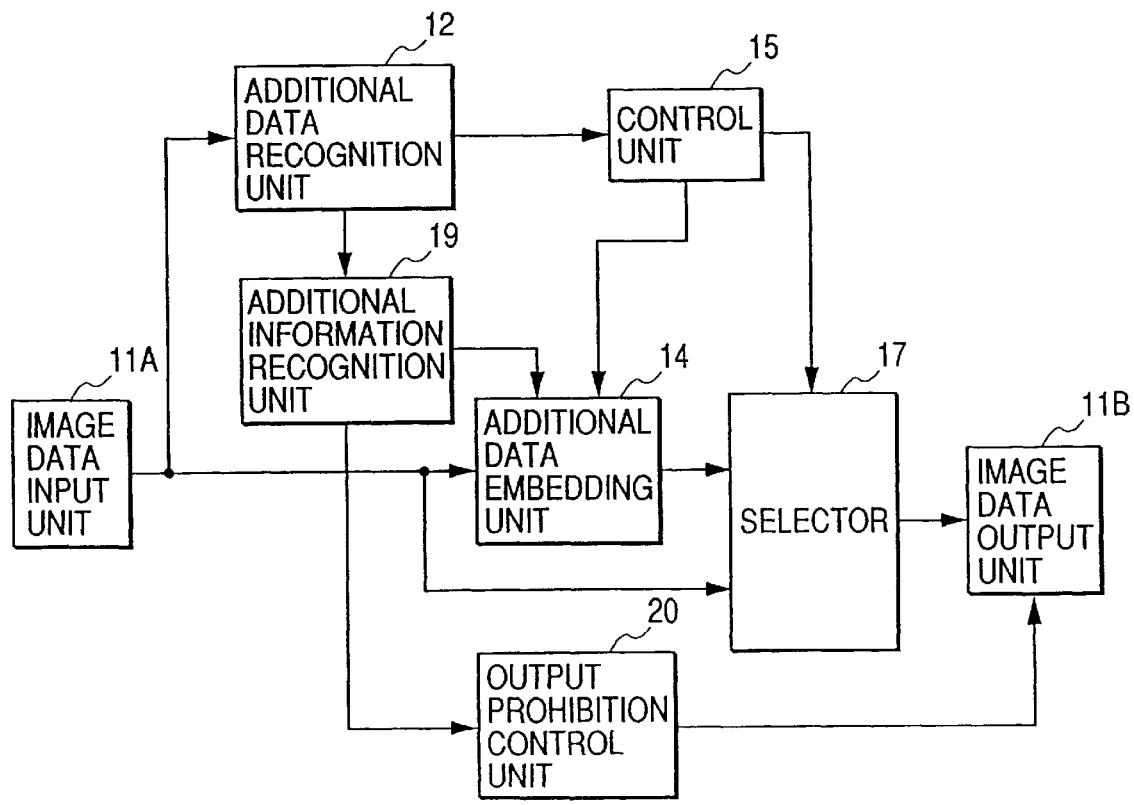
FIG. 9 is a block diagram showing further another variation of the first embodiment.

As further another variation of the first embodiment, as shown in FIG. 9, an additional information recognition unit 19 for recognizing, from first additional data detected in the additional data recognition unit 12, additional information represented by the additional data is provided, while the additional data embedding unit 14 may, instead of appending all additional information recognized in the additional information recognition unit 19, that is, additional information represented by the first additional data as second additional data, append at least parts of the information as second additional data.

Furthermore, if additional information represented by the first additional data cannot be recognized by the additional information recognition unit 19, by affording information indicating the fact to the output prohibition control unit 20, the output of image data from the output prohibition control unit 20 can be prohibited. Thereby, if additional information represented by the first additional data cannot be recognized, the formation of an image from the image data is prohibited.

In the first embodiment, a description has been described of a method of changing an embedding strength by manipulating DCT conversion coefficients before embedding additional data. However, other methods of changing an embedding strength may be employed; for example, a method using wavelet transformation or Fourier transform, a method of differentiating image characteristic values among blocks, and other methods.

In the first embodiment, additional information represented by additional data is used as image data or information for identifying the copyright holder of images. However, in the present invention, it can be arbitrary data such as, e.g., text data representing the contents of an image, and the network address information of image data. This is also true for embodiments described below.

In the first embodiment, the additional data recognition unit 12 recognizes that additional data is appended by detecting the additional data itself appended to image data. However, alternatively, it can also be recognized that additional data is appended, from information indicating that the additional data is appended, inserted in the header portion of image data.

The above-described image processing apparatus 10 according to the first embodiment processes image data from which to form images, and when first additional data is appended to the image data, appends, to the image data, second additional data representing additional information extractable from formed images. However, the present invention is also applicable to the case where the image processing apparatus 10 processes image data from which to display images, and when first additional data is appended to the image data, appends, to the image data, second additional data representing additional information that is extractable from displayed images and unrecognizable to human eyes.

Furthermore, the present invention is also applicable to the case where the image processing apparatus 10 processes image data from which to convert images, and when first additional data is appended to the image data, appends, to the image data, second additional data representing additional information extractable from converted images. This helps to prevent the occurrence of the situation in which additional information cannot be extracted in conversion of images from the JPEG format into the GIF format.

Figure 10:
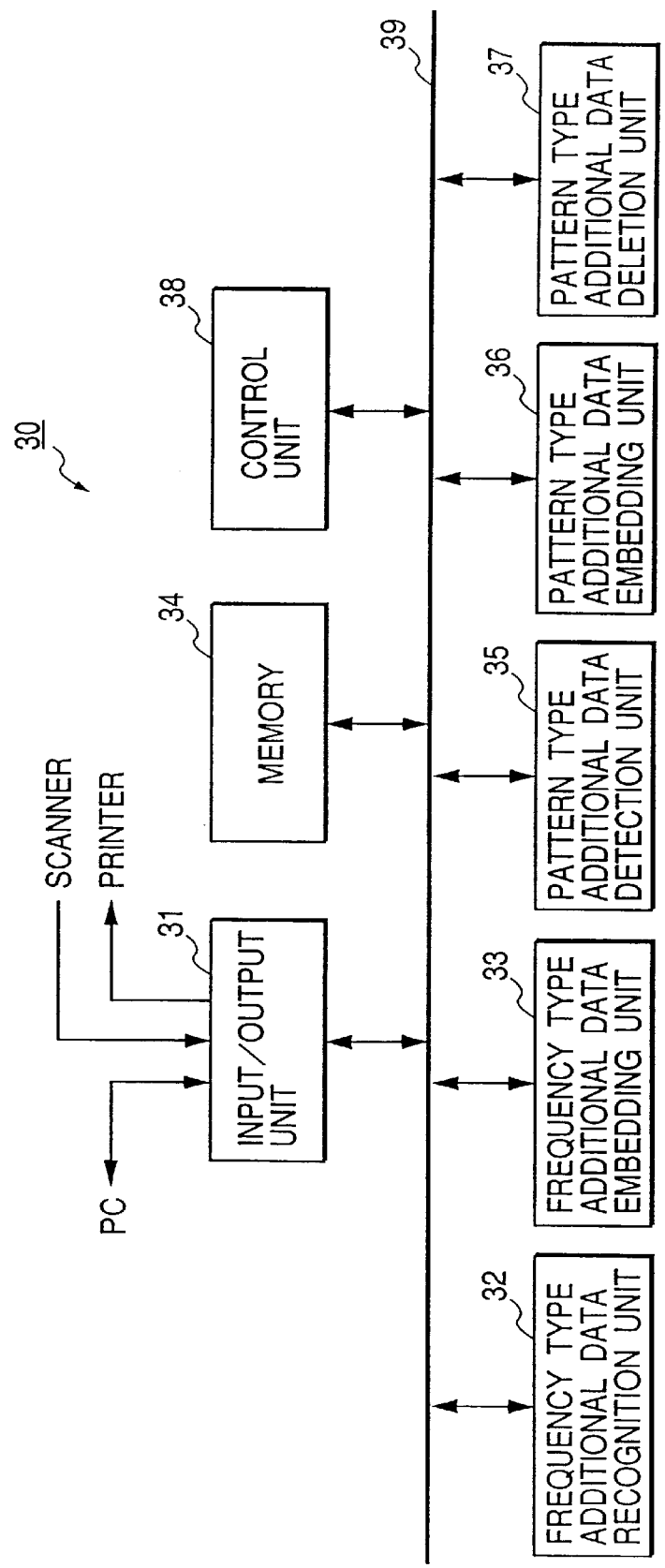
FIG. 10 is a block diagram showing the configuration of an image processing apparatus according to a second embodiment of the present invention.

FIG. 10 is a block diagram showing the configuration of an image processing apparatus of a second embodiment of the present invention. In the second embodiment, unlike the first embodiment in which the embedding strength of additional data is changed for printing by a printer, additional data is reembedded by a method of embedding second additional data suitable for printing by a printer.

The second additional data embedding method embeds additional data by converting each bit of the additional data into a pattern having a minute sloped edge and additionally superimposing the pattern data on image data. The sloped edge patterns are embedded in only yellow components that are visually inconspicuous, and are roughly arranged at wide intervals, thereby arresting degradation of the quality of images to be printed and easing detection of the additional data from the images scanned by a scanner.

An image processing apparatus 30 according to the second embodiment comprises an input/output unit 31 for inputting and outputting image data; a frequency type additional data recognition unit 32 for recognizing additional data embedded by a first embedding method; a frequency type additional data embedding unit 33 for reembedding the additional data in the image data after changing the embedding strength thereof; a memory 34 for storing the image data and the additional data; a pattern type additional data detection unit 35 for detecting additional data embedded in the image data by a second embedding method; a pattern type additional data embedding unit 36 for embedding additional data in the image data by the second embedding method; a pattern type additional data deletion unit 37 for deleting additional data embedded by the second embedding method from the image data; and a control unit 38 for controlling the overall apparatus, which are mutually connected through a bus line 39.

Figure 11:
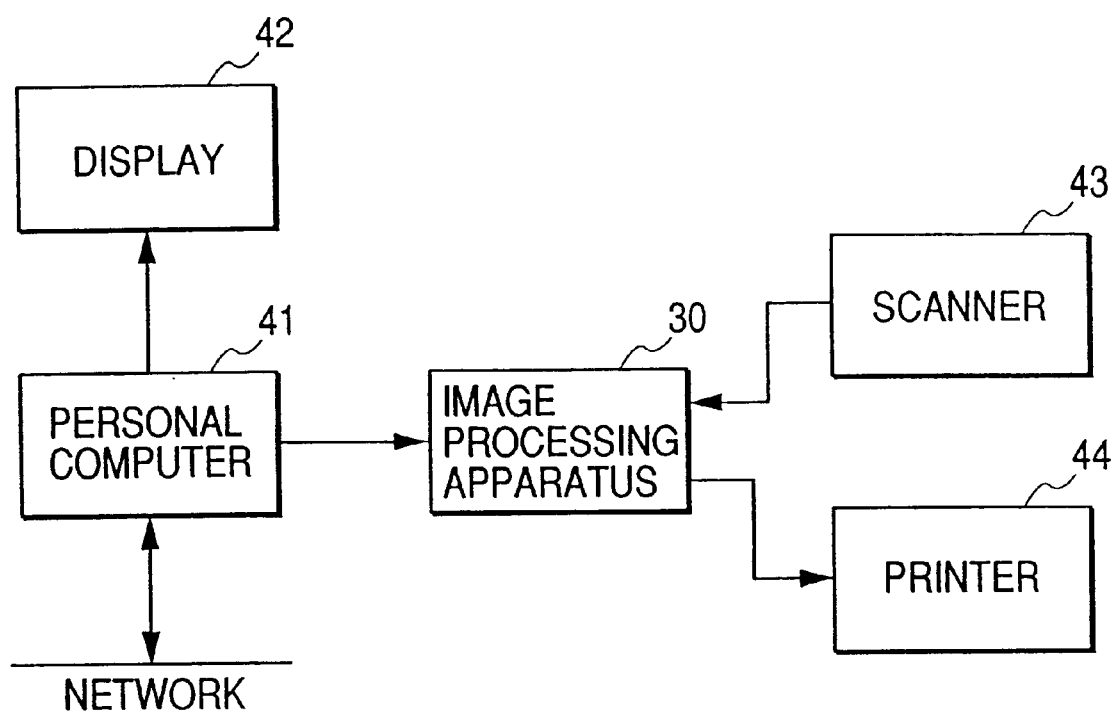
FIG. 11 is a block diagram showing the configuration of a system that uses an image processing apparatus according to the second embodiment.

FIG. 11 shows the configuration of a system that uses the image processing apparatus 30 according to the second embodiment. The system comprises; a personal computer 41 connected to a network; a display 42 connected to the personal computer 41; an image processing apparatus 30 to which image data is supplied from the personal computer 41; a scanner 43 for scanning manuscripts to supply image data thereof to the personal computer 41 via the image processing apparatus 30; and a printer 44 for printing image data output from the image processing apparatus 30.

In the system having the above-described configuration, users receive image data via the network, display the image data on the display 42, view the displayed image, and if necessary, send the image data to the printer 44 via the image processing apparatus 30 to print it on paper. At this time, the image processing apparatus 30 performs recognition processing to determine whether or not the sent image data contains additional data, and reembeds additional data by a second additional data embedding method suitable for printing by the printer 44.

The image processing apparatus 30 not only recognizes additional data appended to image data output to the printer from the personal computer 41 and reembeds the additional data by a method suitable for the printer 44 but also detects additional data from image data scanned by the scanner 43 and reembeds the additional data by a method suitable for display on the display 42 to output the image data to the personal computer 41.

Next, a description will be made of the operation of the image processing apparatus 30 according to the second embodiment and a specific configuration of major portions thereof. Image data sent from the personal computer 41 of FIG. 11 is input from the input/output unit 31 and is stored in the memory 34. Upon termination of input of the image data, the control unit 38 directs the frequency type additional data recognition unit 32 to detect additional data.

The frequency type additional data recognition unit 32 performs recognition processing to determine whether or not input image data contains additional data, and checks the embedding strength thereof. The frequency type additional data recognition unit 32 has the same configuration as that of the additional data recognition unit of the first embodiment used in FIG. 3. Additional data detected in recognition processing of the frequency type additional data recognition unit 32 is sequentially stored in an additional data storage area on the memory 34, as in the first embodiment.

After additional data recognition processing by the frequency type additional data recognition unit 32, the control unit 38 reads additional data from the memory 34, and if the first 16 bits of the detected additional data are a specific bit string, judges that the detected additional data is copyright ID information in which a valid copyright holder is embedded. In this case, the control unit 38 checks the embedding strength, and if the embedding strength is smaller than a preset threshold value, judges that the embedding strength is so poor that the embedded additional data could not be detected from an image printed by the printer 44.

As processing for this case, the control unit 38 adds, to the additional data (copyright ID) stored in the additional data storage area on the memory 34, ID information for identifying a preset user or an operator to direct image formation, information about a printed date, manufacturing numbers for identifying local apparatuses (personal computer 41 and printer 44), a manufacturer, and information indicating a model. Thereby, when printed images (publication) are illegally used, the source of the print can be traced.

Thereafter, the control unit 38 directs the pattern type additional data embedding unit 36 to reembed the additional data detected by recognition processing of the frequency type additional data recognition unit 32 by the second embedding method suitable for printing by the printer 44. If the embedding strength is greater than or equal to a threshold value, or the first 16 bits of the detected additional data are not a specific bit string, the control unit 38 reads image data stored in the memory 34 and directly outputs it to the printer 44 from the input/output unit 31 for printing on paper.

Figure 12:
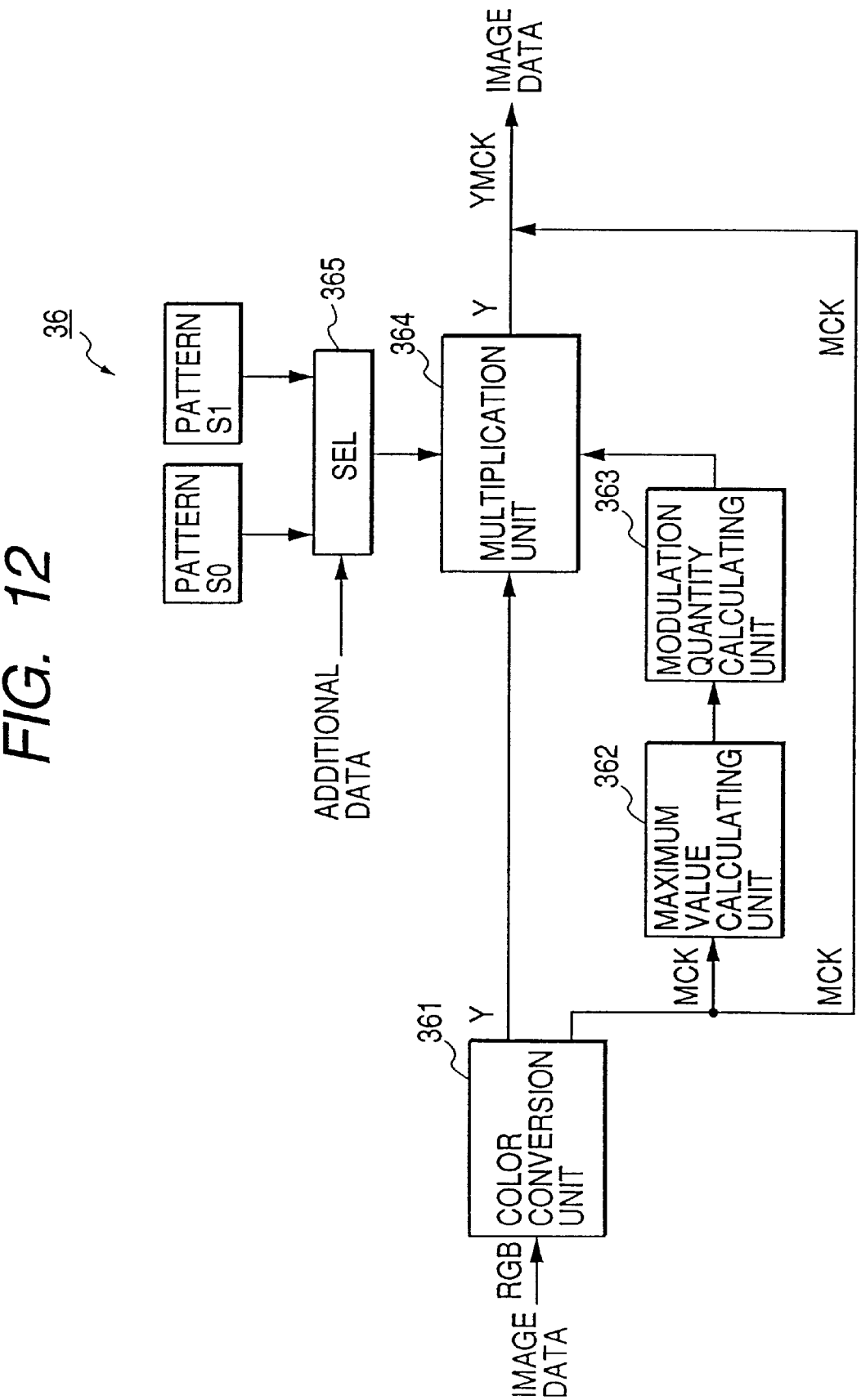
FIG. 12 is a block diagram showing a specific configuration of a pattern type additional data embedding unit.

FIG. 12 shows a specific configuration of the pattern type additional data embedding unit 36. The pattern type additional data embedding unit 36 comprises: a color conversion unit 361; a maximum value calculating unit 362; a modulation quantity calculating unit 363; a multiplication unit 364; and a selector 365. Image data read on a block basis from the memory 34 is input to the pattern type additional data embedding unit 36.

In the pattern type additional data embedding unit 36 having the above-described configuration, input RGB image data is converted, in the color conversion unit 361, from the RGB color space into the YMCK color space, which is the color space of the printer 44, and is separated into Y components and MCK components for output. Image data of the MCK components is input to the maximum value calculating unit 362, and in the maximum value calculating unit 362, the maximum value of the pixel value of each component is obtained on a pixel basis and is supplied to the modulation quantity calculating unit 363.

In the modulation quantity calculating unit 363, a modulation quantity of a pattern is calculated by the maximum value of MCK components in the position where the pattern is embedded. The modulation quantity of a pattern is calculated such that it becomes greater when the maximum value of MCK components is larger, and it becomes smaller when the maximum value of MCK components is smaller. The calculated modulation value is supplied to the multiplication unit 364.

After a modulation quantity for one block is calculated, one additional data bit is read from the additional data storage area on the memory 34 and is afforded to the selector 365 as select information. When the additional data bit is afforded, the selector 365 selects either of two types of patterns S0 and S1, depending on the bit information, and supplies it to the multiplication unit 364.

The multiplication unit 364 multiplies each coefficient value of the pattern selected by the selector 365 by the modulation quantity of an identical pixel position, obtained previously in the modulation quantity calculation unit 363, and further adds the coefficient value to each pixel of image data of Y component of an identical pixel position, supplied from the color conversion unit 361. In this way, image data containing Y components in which the additional data is embedded, and MCK components is output from the pattern type additional data embedding unit 36 and is stored in the memory 34. The above processing is repeated for all blocks.

FIG. 13 shows an example of the patterns S0 and S1. FIG. 13A shows the pattern S0 and FIG. 13B shows the pattern S1. The size of the patterns is 16×16, which is the same as the block size of image data. In comparison with the block size, portions having plus or minus coefficient values arranged slantingly are smaller. This is done to arrest a visually conspicuous display. Also, to prevent the white background and low-density areas of images from becoming yellowish and ease detection of patterns embedded in high-density areas, a plus coefficient value b is set to a relatively small value and a minus coefficient value a is set to a relatively large value.

FIG. 14 is diagrams for explaining patterns reembedded in image data in the pattern type additional data embedding unit 36. FIG. 14A shows image data before a pattern is embedded, and FIG. 14B shows image data after a pattern is embedded. When the density of image data is low, relatively small edges are embedded in Y components, and as the density of Y components becomes higher, larger edges are embedded. As the density of MCK components becomes higher, edges become larger.

This terminates the reembedding of pattern data by the pattern type additional data embedding unit 36. Upon termination of the reembedding of pattern data, the control unit 38 reads the reembedded image data from the memory 34 and outputs it to the printer 44 from the input/output unit 31 for printing on paper.

Next, a description will be made of the operation of the image processing apparatus 30 when images printed on paper are scanned by the scanner 43. Image data scanned by the scanner 43 is input from the input/output unit 31 and is stored in the memory 34. When the image data has been stored in the memory 34, the control unit 38 directs the pattern type additional data detection unit 35 to detect additional data embedded by the second embedding method.

Figure 15:
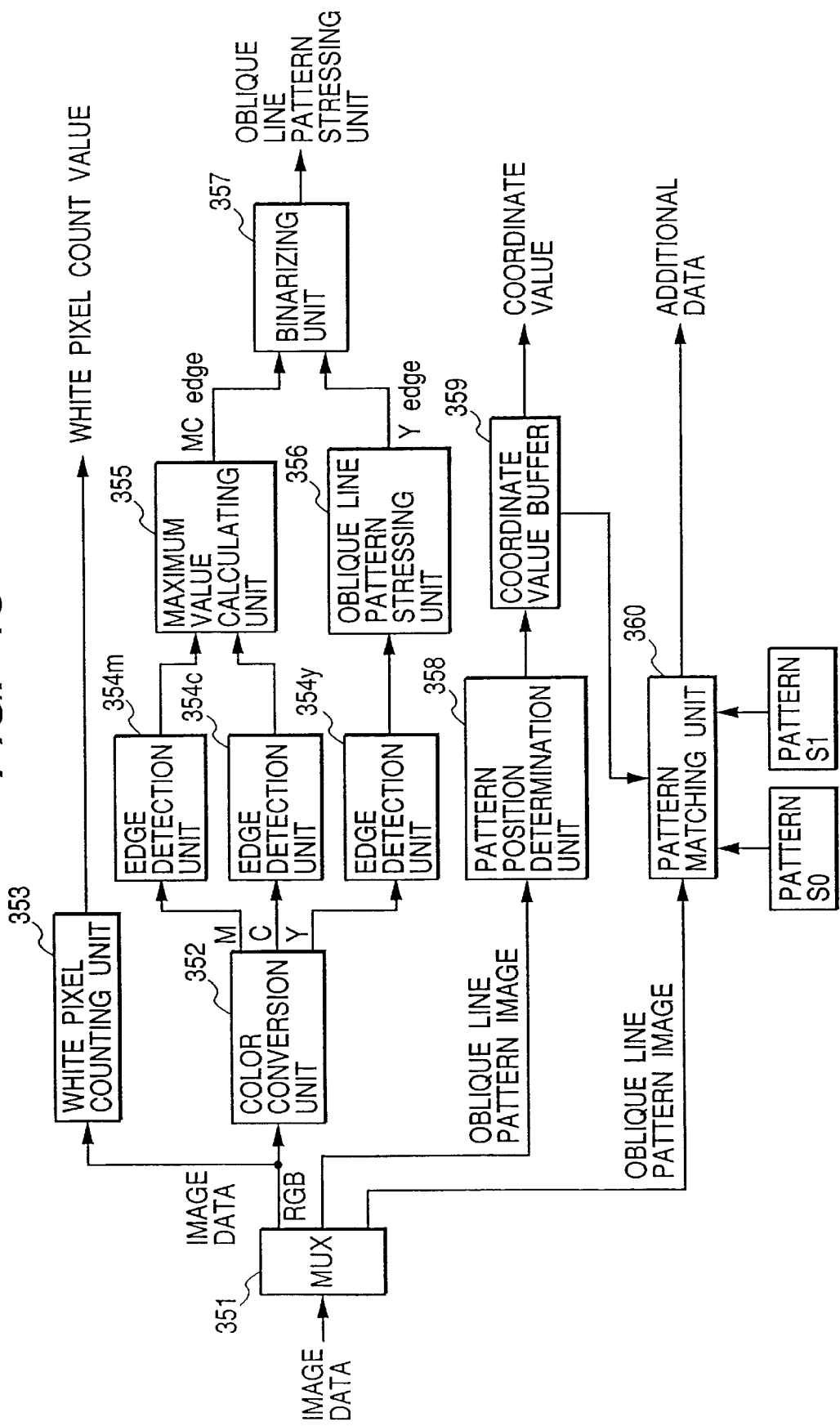
FIG. 15 shows a specific configuration of a pattern type additional data detection unit.

FIG. 15 shows a specific configuration of the pattern type additional data detection unit 35. The pattern type additional data detection unit 35 comprises: a multiplexer (MUX) 351; a color conversion unit 352; a white pixel count unit 353; edge detection units 354m, 354c, and 354y; a maximum value calculating unit 355; an oblique line pattern stressing unit 356; a binarizing unit 357; a pattern position determination unit 358; a coordinate buffer 359; and a pattern matching unit 360. Image data stored in the memory 34 is input to the pattern type additional data detection unit 35.

In the pattern type additional data detection unit 35 having the above-described configuration, input image data is input to the color conversion unit 352 and the white pixel count unit 353 via the multiplexer 351. The image data input to the color conversion unit 352 is converted from the RGB color space into the YMC color space in the color conversion unit 352 and is separated into Y components and MC components.

The Y components are supplied to the edge detection unit 354y to undergo edge detection filter processing. Thereafter, in the oblique line pattern stressing unit 356, stress filter processing is performed to stress an oblique line pattern to create an edge image Yedge, which is supplied to the binarizing unit 357. On the other hand, image data of MC components is subjected to edge detection filter processing in parallel by the two edge detection units 354m and 354c, and an edge image MCedge is created by selecting the greater of the pixel values by the maximum value calculating unit 355 and is supplied to the binarizing unit 357.

In the binarizing unit 357, binarizing processing is performed as described below by the two input edge images Yedge and MCedge, and two preset threshold values TH1 and TH2. That is, if the edge image Yedge is greater than the threshold value TH1 and the edge image MCedge is smaller than the threshold value TH2, the pixel value "1" is output; otherwise, the pixel value "0" is output.

Binary image data created in this way is oblique line pattern image data in which only oblique line edges of Y components are extracted. The oblique line pattern images are output from the pattern type additional data detection unit 35 and are temporarily stored in the memory 34. In parallel with the above processing, the white pixel counting unit 353 compares each pixel value of the input image data with a threshold value to judge whether the pixel is a white pixel or not, counts the number of white pixels, and outputs the count value to the control unit 38.

Next, the oblique line pattern image data stored in the memory 34 is input to the pattern type additional data detection unit 35. The oblique line pattern image data is input to the pattern position determination unit 358 via the multiplexer 351 and is subjected to pattern position calculation processing as described below.

For the input binary oblique line pattern image data P(i,j), a projection distribution Tx(i) in the primary scanning direction and a projection distribution Ty(j) in the secondary scanning direction are obtained respectively by the following expression.

$$Tx(i)=\Sigma j(P(i,j))$$

$$Ty(i)=\Sigma i(P(i,j))$$

Thereafter, convolution projection distributions Ux(n) and Uy(m) are obtained by adding the obtained projection distributions at an interval of 16, which is the same pixel interval as the block size.

$$Ux(n)=\Sigma k(Tx(n+16*k))n=1, 2, \ldots 16$$

$$Uy(m)=\Sigma k(Ty(m+16*k))n=1, 2, \ldots 16$$

The maximum values of the obtained convolution projection distributions in the primary scanning direction and the secondary scanning direction are the starting coordinates of pattern positions in the primary scanning direction and the secondary scanning direction, respectively, and the pattern position coordinates are spaced every 16 pixels from the coordinates. The obtained coordinate values are stored in the coordinate buffer 359 and, at the same time, are output from the pattern type additional data detection unit 35 and are stored in the coordinate storage area on the memory 34.

Figure 16A:
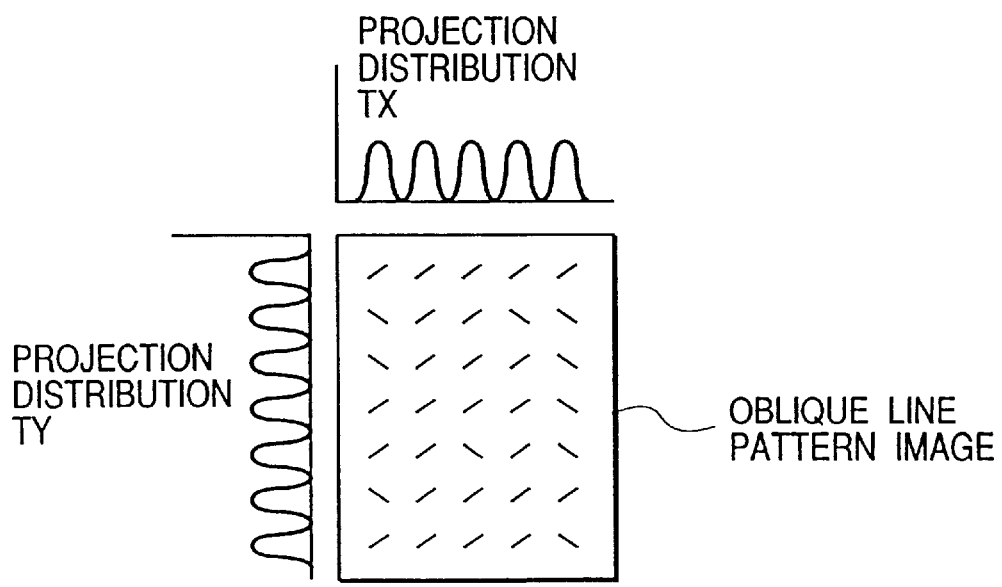
FIGS. 16A, 16B and 16C are diagrams for explaining a detection operation in a pattern type additional data detection unit.
Figure 16B:
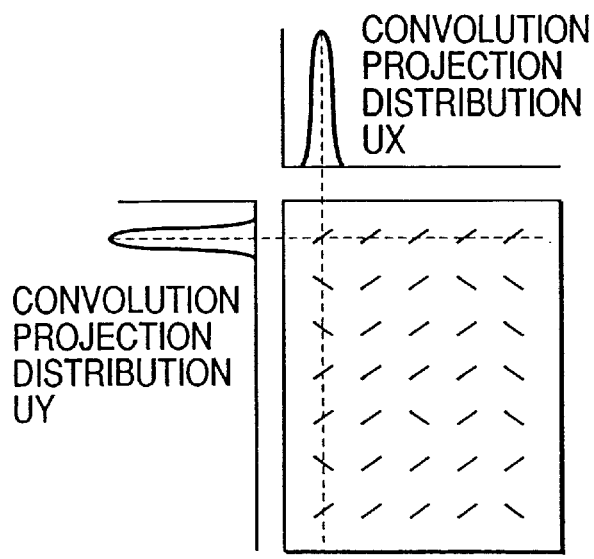
Figure 16C:
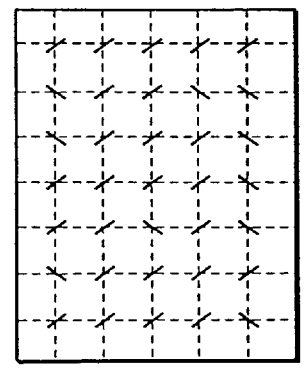

If image data input from the scanner 43 contains additional data, the obtained projection distributions are cyclic distributions in which mountains and valleys are continuously repeated at a fixed interval, that is, an interval of 16 pixels, as shown in FIG. 16A, and a convolution projection distribution is a distribution having one mountain as shown in FIG. 16B and the maximum value thereof agrees with a pattern position. With this coordinate as a starting point, if coordinate values are incremented 16 by 16 in the primary scanning direction and the secondary scanning direction, the coordinate values of other patterns are obtained as shown in FIG. 16C.

Thereafter, the oblique line pattern image stored in the memory 34 are input to the pattern type additional data detection unit 35. In the obtained pattern position coordinates, processing, for detecting additional data is performed by pattern matching by the pattern matching unit 360.

The pattern matching unit 360 reads a pattern position coordinate from the coordinate buffer 359 and reads one block B of the oblique line pattern image data (binary image) stored in the memory 34 with the coordinate as a center. Matching values M0 and M1 of two patterns are calculated for the read block of the image data by the following expressions. Pattern S0 and S1 used are shown in FIG. 17. AND of the following expressions denote a logical product.

$$M0 = \Sigma ij(\text{AND }(B(i,j), S0(i,j)))$$

$$M1 = \Sigma ij(\text{AND }(B(i,j), S0(i,j)))$$

The matching values M0 and M1 obtained by the above expressions and a preset threshold value TH3 are compared, and if the matching value M0 is greater than the matching value M1 and the threshold value TH3, the value "0" is output as an additional data bit, and otherwise, the value "1" is output as an additional data bit. These values are stored in the additional data storage area on the memory 34. The above-described pattern matching processing is performed for all pattern position coordinates and then the additional data detection processing terminates.

After the additional data detection processing by the pattern type additional data detection unit 35, the control unit 38 reads the additional data stored in the memory 34. If the first 16 bits of detected additional data are a specific bit string, the control unit 38 judges that the detected additional data is copyright ID information in which a valid copyright holder is embedded.

In this case, the control unit 38 checks the number of white pixels counted by the pattern type additional data detection unit 35, and if the number of white pixels is greater than or equal to the preset threshold value, judges that, when the image is displayed by the display 42, yellow oblique line patterns existing in white background portions would become conspicuous because the white background portions occupy a large amount of the image data (hereinafter referred to as scanned-in imaged data) input from the scanner 43. Then, the control unit 38 directs the pattern type additional data detection unit 35 to delete the oblique line edge patterns from the scanned-in image data and then directs the frequency type additional data embedding unit 33 to embed additional data.

If the number of white pixels is less than the preset threshold value, the control unit 38 judges that the scanned-in image data has no problem with the image quality, and bypasses the oblique line pattern deletion processing and directs the frequency type additional data embedding unit 33 to embed additional data. If the first 16 bits of detected additional data are not a specific bit string, the scanned-in image data is output without modifications from the input/output unit 31 to the personal computer 41.

Figure 18:
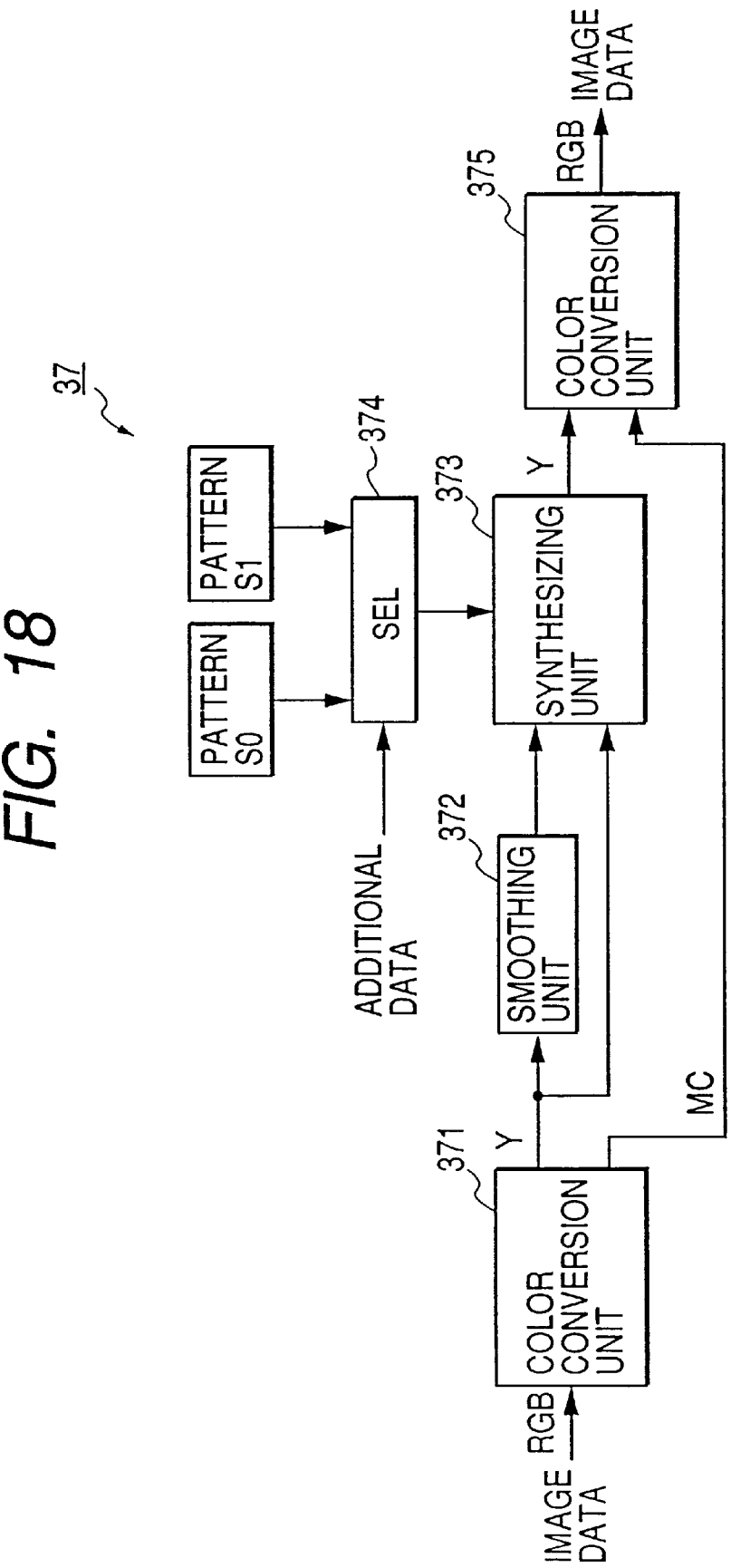
FIG. 18 is a block diagram showing a specific configuration of a pattern type additional data deletion unit.

FIG. 18 shows a specific configuration of the pattern type additional data deletion unit 37. The pattern type additional data deletion unit 37 comprises: a color conversion unit 371; a smoothing unit 372; a synthesizing unit 373; a selector 374; and a color conversion unit 375. The pattern type additional data deletion unit 37 reads a pattern position coordinate previously obtained from the coordinate storage area on the memory 34 and reads one block of scanned-in image data stored in the memory 34 with the coordinate value as a center.

In the pattern type additional data deletion unit 37 having the above-described configuration, the read block of image data is converted from the RGB color space into the YMC color space in the color conversion unit 371 and is separated into Y components and MC components. The Y components are supplied directly to the synthesizing unit 373 and are subjected to smoothing filter processing in the smoothing unit 372 before being supplied to the synthesizing unit 373.

Either of the patterns S0 and S1 selected by the selector 374 based on the additional data bit read from the memory 34 is input to the synthesizing unit 373. The synthesizing unit 373 replaces a pixel of the read block of image data corresponding to a nonzero coefficient within the pattern by a pixel of the image data having been subjected to smoothing filter processing and outputs the pixel. FIG. 17A shows the pattern S0 and FIG. 17B shows the pattern S1.

Thereafter, the original image data of the RGB space is restored by performing color conversion processing again in the color conversion unit 375 and is output. The output image data is stored in the memory 34. The above processing is repeated for all blocks to delete oblique edge patterns from the scanned-in image data stored in the memory 34.

After termination of the additional data detection processing by the pattern type additional data detection unit 35, the control unit 38 directs the frequency type additional data embedding unit 33 to embed additional data again.

Figure 19:
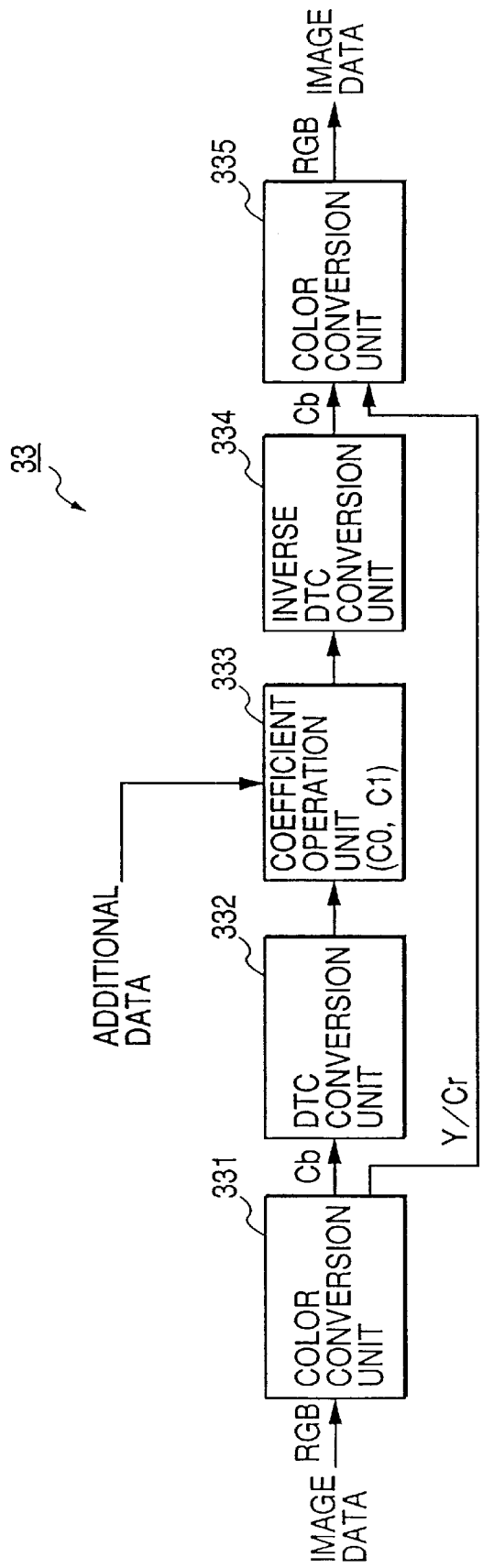
FIG. 19 a block diagram showing a specific configuration of a frequency type additional data embedding unit.

FIG. 19 shows a specific configuration of the frequency type additional data embedding unit 33. The frequency type additional data embedding unit 33 comprises; a color conversion unit 331; a DCT conversion unit 332; a coefficient operation unit 333; an inverse DCT conversion unit 334; and a color conversion unit 335. Image data of the RGB color space is input on a block basis to the frequency type additional data embedding unit 33.

Image data read on a block basis from the memory 34 is input to the color conversion unit 331, and in the color conversion unit 331, the image data is converted from the RGB space to the color space YCrCb of a brightness color difference system and only image data of color difference components Cb is supplied to the DCT conversion unit 332. The DCT conversion unit 332 subjects the image data of Cb components to DCT conversion processing and affords DCT coefficients to the coefficient operation unit 333.

The coefficient operation unit 333 selects specific coefficients of an intermediate frequency area as shown in FIG. 4, and replaces the absolute values of the coefficient values by either of two preset coefficient values C0 and C1, determined depending on an additional data bit read on a bit basis from the additional storage area on the memory 34 in such a way that a positive sign is assigned if the original coefficient values are positive, and a negative sign is assigned if the original coefficient values are negative.

In this case, if the additional data bit is the value "0", the absolute values of the coefficient values are replaced by the embedding coefficient C0, and if the additional data bit is the value "1", the absolute values of the coefficient values are replaced by the embedding coefficient C1. The embedding coefficient value C0 is set to a value greater than the threshold value TH, and the embedding coefficient value C1 is set to a value smaller than the threshold value TH.

The DCT coefficients changed to enhance the embedding strength of the additional data by the coefficient operation unit 333 are input to the inverse DCT conversion unit 334. After the DCT coefficients are returned to the original image data Cb by the inverse DCT conversion unit 334, the image data Cb is supplied to the color conversion unit 335. The color conversion unit 335 synthesizes the image data Cb with image data Y/Cr of other color components not subjected to embedding strength change processing for the additional data to return the synthesized image data to the original RGB color space.

The image data output from the frequency type additional data embedding unit 33 is stored in the identical address of the memory 34. That is, identical blocks of the image data are rewritten with the embedding strength enhanced. The above processing is repeated for all blocks. Upon termination of the additional data embedding processing by the frequency type additional data embedding unit 33, the control unit 38 performs control so as to read the image data changed in embedding strength, stored in the memory 34, and transfer it from the input/output unit 31 to the personal computer 41.

As described above, in the image processing apparatus 30 according to the second embodiment, for example, when it is recognized that additional data is appended to image data output from the personal computer 41 to the printer 44, additional data is appended to the image data by an embedding method suitable for the printer 44 to output the image data. By this process, even if additional data having as low an embedding strength as would not cause degradation of image quality during displaying on the display 42 is appended to image data, since additional data suitable for the printer 44 has been appended to the image data before printout, additional information represented by the additional data could be extracted without failure from formed images.

Furthermore, when additional data is detected from image data scanned by the scanner 43, by appending and outputting additional data by an embedding method suitable for display by the display 42, even if the additional data appended to the image data might degrade image quality, since additional data changed to as low an embedding strength as would not cause degradation of image quality is reembedded, there could be obtained electronic image data to which additional data not causing degradation of image quality and representing additional information such as copyright is correctly appended.

In the above-described second embodiment, although an example of use of oblique line edge patterns has been described, the present invention is not limited to the use of oblique line edge patterns; other patterns may be used if they are visually inconspicuous on images printed on paper and are easy to detect, for example, such as patterns consisting of collections of dots obliquely arranged, and minute vertical or horizontal patters. As information to be embedded, in addition to information described in the above-mentioned embodiment, any other information may be embedded.

In the first and second embodiments, although a description has been made of the case of a configuration in which additional data recognition (detection) and embedding processing are performed in independent image processing apparatuses 10 and 30, the present invention is not limited to this configuration. The above-described processing may be performed by software internal to a personal computer, or the image processing apparatuses may be integrally incorporated inside a printer.

Figure 20:
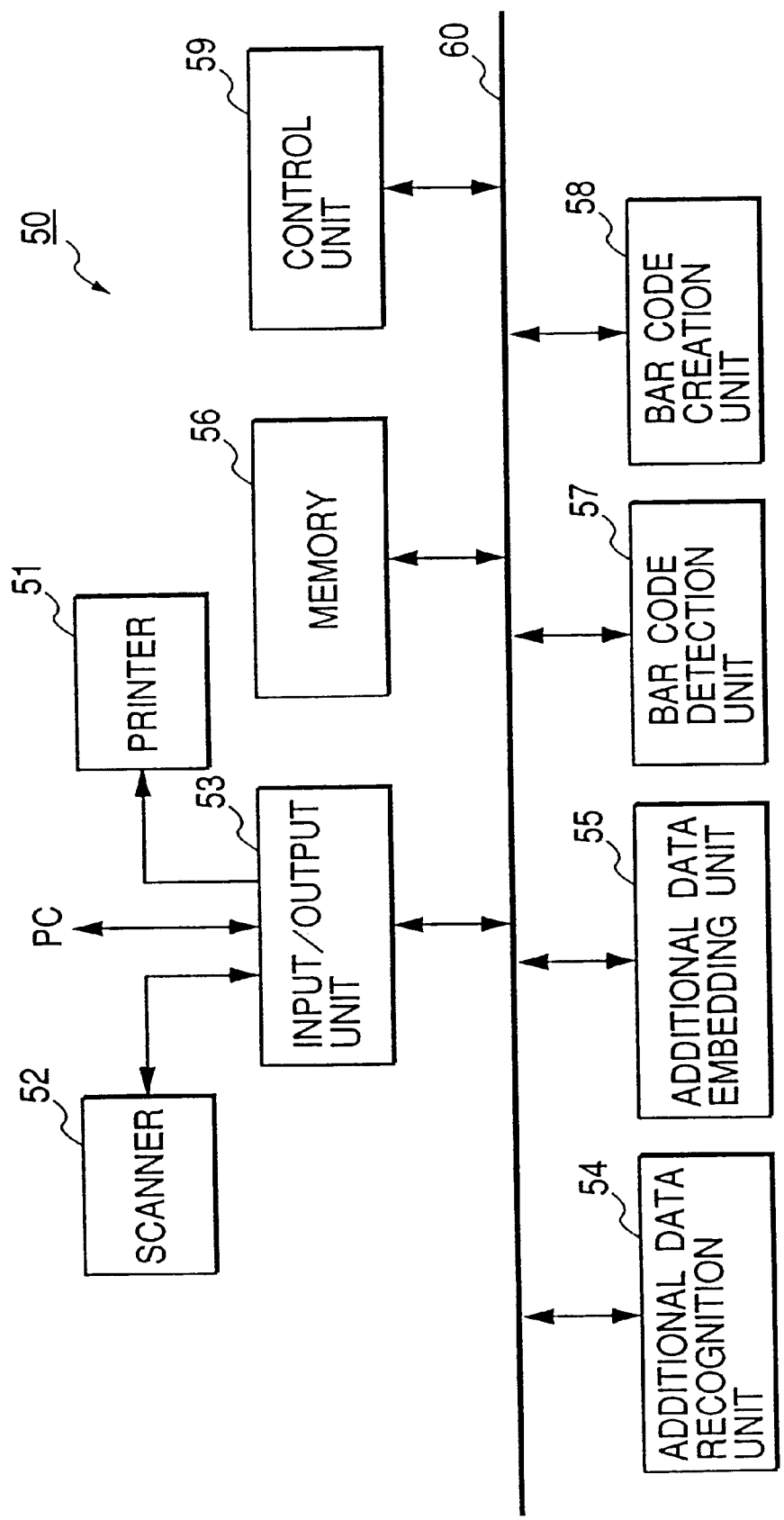
FIG. 20 is a block diagram showing the configuration of an image processing apparatus according to a third embodiment of the present invention.

FIG. 20 is a block diagram showing the configuration of an image processing apparatus according to a third embodiment of the present invention. An image processing apparatus 50 according to the third embodiment, unlike the image processing apparatuses 10 and 30 according to the first and second embodiments, comprises: a printer 51 for embedding additional information in images to be printed by use of invisible infrared ink; and a scanner 52 capable of scanning images printed in the infrared ink.

The printer 51 prints image data in ink of four colors YMCK, and prints invisible pattern images in infrared ink. Its specific configuration will be described later. The scanner 52 scans manuscripts as image data consisting of three colors RGB, and is also capable of scanning image data of infrared light at the same time. Its specific configuration will be described later.

The image processing apparatus 50 further includes: an input/output unit 53 for inputting and outputting image data; an additional data recognition unit 54 for recognizing additional data embedded in image data by a given embedding method; an additional data embedding unit 55 for embedding additional data in image data; a memory 56 for storing image data and additional data; a bar code detection unit 57 for detecting additional data represented in bar code from image data input from the scanner 2 via the input/output unit 53; a bar code creation unit 58 for creating bar code image data indicating additional data recognized by the additional data recognition unit 54; and a control unit 59 for controlling the overall apparatus, which are mutually connected through a bus line 60.

The configuration of an overall system using an image processing apparatus 50 according to the third embodiment is basically the same as that of FIG. 11 showing an example of application of the image processing apparatus 30 according to the second embodiment. The image processing apparatus 50 according to the third embodiment corresponds to the image processing apparatus 30, scanner 43, and printer 44 of FIG. 11, and the printer 51 corresponds to the printer 44, and the scanner 52 corresponds to the scanner 43.

A description will be made of the operation of a system using the image processing apparatus 50 having the above-described configuration according to the third embodiment.

Image data sent from a personal is input from the input/output unit 53 and is stored in the memory 56. Upon termination of the input of the image data, the control unit 59 controls the additional data recognition unit 54 for recognition processing for additional data. The additional data recognition unit 54 determines whether or not additional data is appended to the input image data. As the additional data recognition unit 54, the same configuration used in FIG. 3 as that of the additional data recognition unit of the first embodiment is used.

In additional data recognition processing in the additional data recognition unit 54, if it is recognized that the additional data is copyright ID information, bar code image data indicating the additional data is created in the bar code creation unit 58, and the bar code image data created in the bar code creation unit 58 is output to the printer 51 via the input/output unit 53 together with the input image data. The printer 51 prints the image data in YMCK ink and the bar code image data in infrared ink and outputs them.

Figure 21:
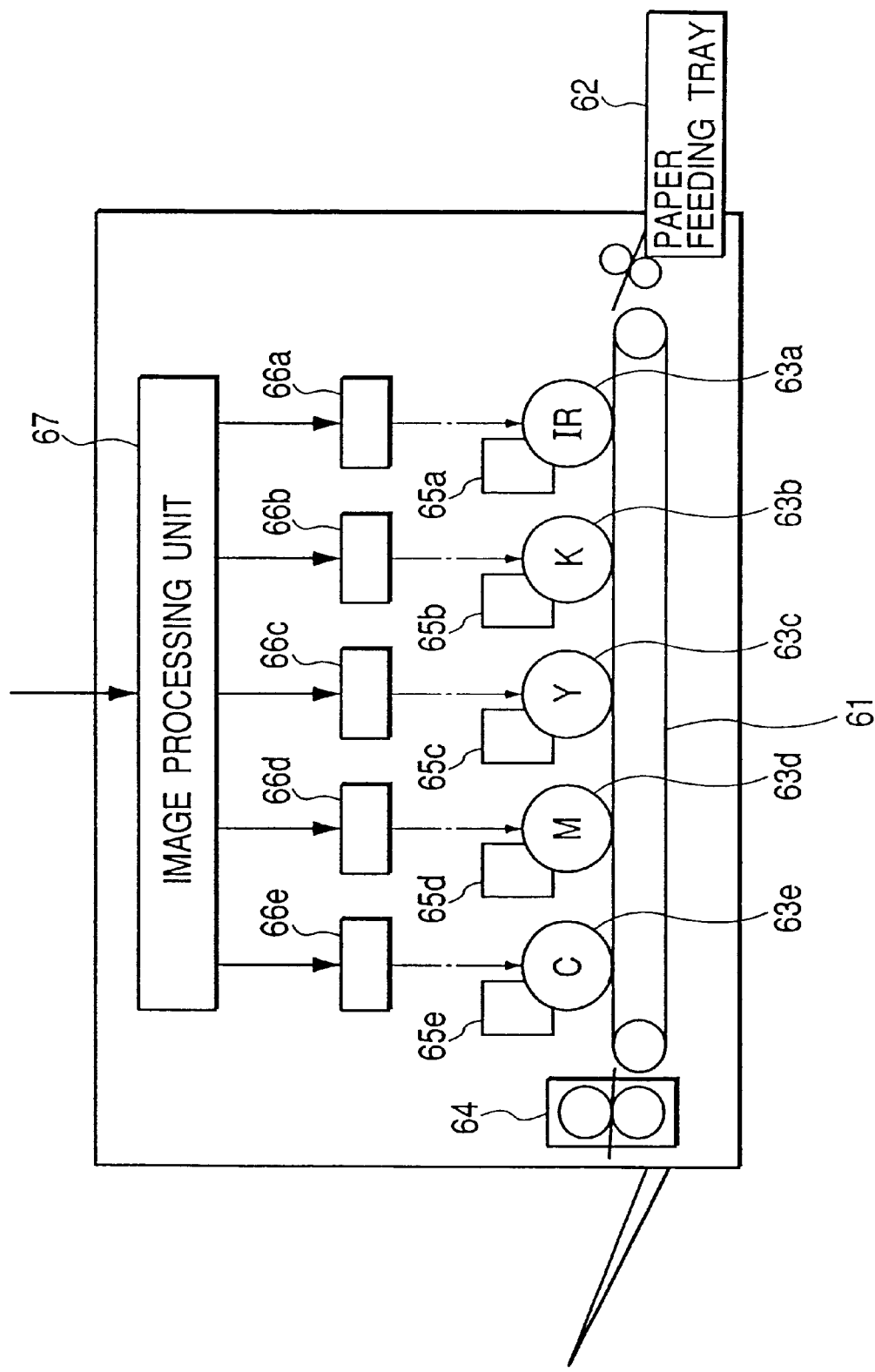
FIG. 21 shows a specific configuration of a printer capable of printing invisible images.

FIG. 21 shows a specific configuration of a printer 51 capable of printing images made invisible by infrared ink. The printer 51 according to the specific example employs a tandem configuration in which a total of five photosensitive drums, four for toner for four colors YMCK and one for infrared (1R) toner, are arranged in parallel.

Specifically, the respective photosensitive drums 63a to 63e for IR toner, K toner, Y toner, M toner, and C toner are disposed in parallel on a transport belt 61 sequentially from a paper feeding tray 62. A fixing unit 64 is provided at the end of a transport destination of the transport belt 61. Corresponding to the photosensitive drums 63a to 63e, developers 65a to 65e and laser beam scanners 66a to 66e are provided respectively. Bar code image data and image data of KYMC are afforded to the laser beam scanners 66a to 66e from the image processing unit 67.

In the printer 51 having the above-described configuration, the image data of RGB color space and bar code image data output from the image processing apparatus 50 previously described are input to an image processing unit 67. The image processing unit 67 color-converts the input image data of RGB color space into image data of YMCK color space and separates the image data of the four colors and the bar code image data, and outputs in parallel the image data with delays corresponding to the distances among the photosensitive drums 63a to 63e.

The bar code image data output from the image processing unit 67 is afforded to a laser beam scanner 66a. The laser beam scanner 66a forms a latent image on the photosensitive drum 63a based on the bar code image data. Thereafter, an infrared toner image is developed by the developer 65a and is transferred to paper on the transport belt 61. In the same way, image data of other color components is also transferred sequentially on paper and is fixed by the fixing unit 64, and then is discharged to the tray.

By the above-described series of printing processes, a bar code image is printed on printed paper by an infrared toner and an image is printed by YMCK toners on top of it.

Figure 22:
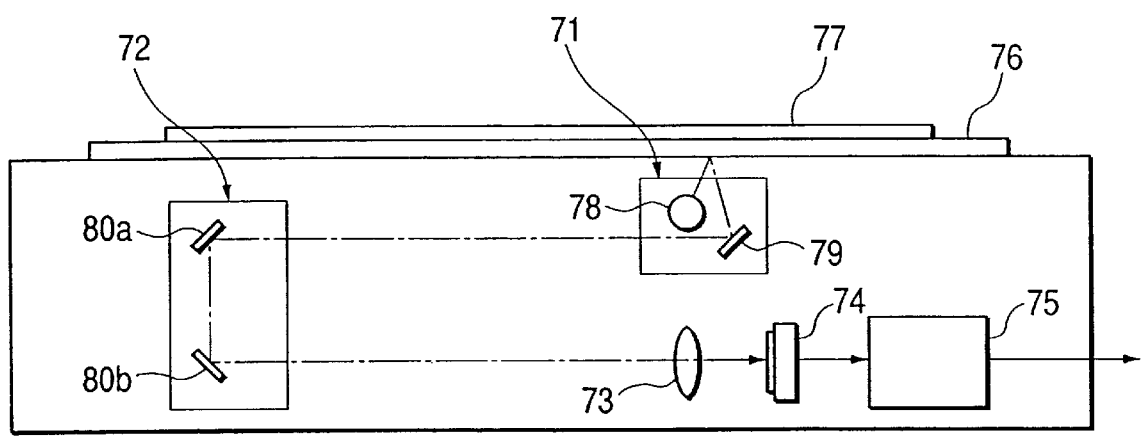
FIG. 22 shows a specific configuration of a scanner capable of scanning invisible images.

Next, a description will be made of a scanner 52 capable of invisible images printed in infrared ink. FIG. 22 shows a specific configuration of the scanner 52. The scanner 52 comprises: a read optical system 71; a mirror system 72; a lens 73; a CCD image sensor 74; and a video circuit 75.

The read optical system 71 comprises: an illuminating lamp 78 for illuminating a manuscript 77 mounted on platen glass 76; a full rate mirror 79 for reflecting reflected light from the manuscript 77 based on illuminating light from the illuminating lamp 78 toward the mirror system 72. The mirror system 72, which comprises two half rate mirrors 80a and 80b, reflects read light from the read optical system 71 toward the CCD image sensor 74.

Figure 23:
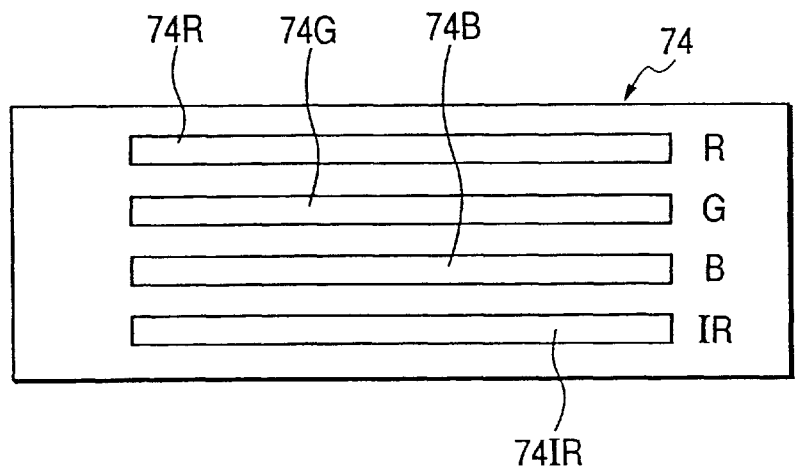
FIG. 23 is a front view showing a CCD image sensor.

The CCD image sensor 74 comprises four line sensors 74R, 74C, 74B, and 74IR disposed in parallel with each other as shown in FIG. 23, for example. These line sensors 74R, 74G, 74B, and 74IR are provided with color filters having the spectral characteristic of reading only red (R) light, green (G) light, blue (B) light, and infrared (IR) light, respectively.

A description will be made of the operation of the scanner 52 having the above-described configuration in scanning in images containing bar codes printed in infrared ink. A manuscript 77 mounted on the platen glass 76 is illuminated by the illuminating lamp 78. Reflected light from the manuscript 77 based on the illuminating light is reflected as read light by the full tone mirror 77 and half tone mirrors 80a and 80b, and then enters the CCD image sensor 74 via the lens 73.

The CCD image sensor, by photoelectrically converting the incident light, reads a visible RGB image by the respective three line sensors 74R, 74G, and 74B for R, G, and B lights and an infrared image by the line sensor 74IR for infrared (IR) light, and outputs the visible RGB image and the infrared image as analog video signals. The analog video signals output from the CCD image sensor 74 are converted into digital image data by the video circuit 75 internal to the scanner and are output with delays corresponding to the distances among the sensors 74R, 74G, 74B, and 74IR.

In the scanner 52, the image data read by the line sensors 74R, 74G, and 74G for R, G, and B and the infrared image data read by the line sensor 74IR for infrared light are stored in the memory 56 via the input/output unit 53 in FIG. 20. Upon termination of input of the image data, the control unit 59 directs the bar code detection unit 57 to detect additional data (infrared image data). The bar code detection unit 57 performs processing for detecting additional data represented in the bar code image, based on the infrared image data stored in the memory 56.

If the detected additional data is copyright ID information, the control unit 59 directs the additional data embedding unit 55 to embed the additional data. The additional data embedding unit 55 embeds the detected additional data in the image data stored in the memory 56 and sends it to the personal computer via the input/output unit 53. The additional data should be embedded with as low an embedding strength as would not degrade image quality when displayed on a display.

As described above, in the image processing apparatus 50 according to the third embodiment, for example, when it is recognized that additional data is appended to image data output from the personal computer to the printer, additional information is appended to an image to be printed, by an invisible image forming material such as infrared ink in the printer 51. By this process, even if additional data having as low an embedding strength as would not cause degradation of image quality during displaying on the display is appended to image data, since additional information can, during printout, be embedded in an image to be printed, by an invisible image forming material, additional information represented by the additional data can be extracted without failure from formed images by a scanner capable of reading invisible images.

During scanning of a bar code image formed with an invisible image forming material by the scanner 52, when additional data represented by the bar code image is detected by the bar code detection unit 57, the detected additional data is output embedded in image data, whereby electronic image data to which additional data representing additional information such as a copyright is appended without failure can be obtained.

Figure 24:
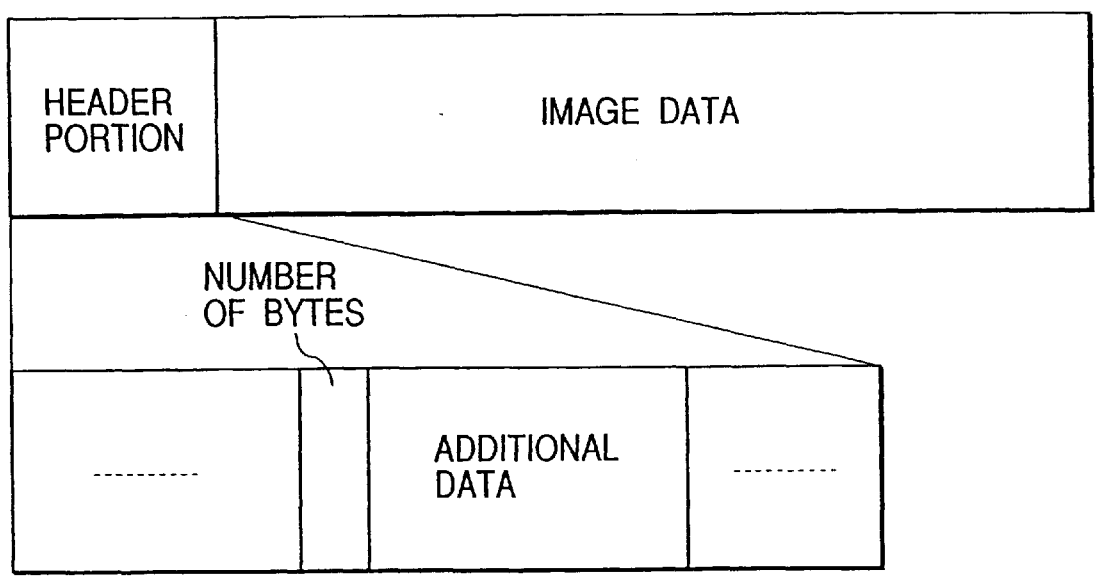
FIG. 24 shows the format of image data having a header portion.

In the first, second, and third embodiments, the cases of additionally superimposing additional data on image data have been described. However, since a header portion is always provided at the beginning of image data, additional data may be embedded in the header portion. FIG. 24 shows the format of image data.

In the format of image data, the size of the image data and other information are stored in the header portion, in part of which an area for storing additional data is provided. Any data can be stored in the area of the header portion for storing additional data. At the first two bytes of additional data, the length (bytes) of the stored additional data is stored such that the length of the additional data can be freely set.

In this way, the same processing performed by the image processing apparatuses according to the described-above embodiments is performed also for image data to which additional data is embedded in the header portion. Specifically, input image data and additional data are stored in a memory; the additional data stored in the memory is checked; if the first 16 bits are a specific bit string, it is judged that the additional data is copyright ID information with a valid copyright holder embedded; and the additional data is embedded in the header portion of the image data before it is output to a printer.

Not only additional data is embedded in image data only when the first 16 bits of the additional data are a specific value as described above, but also whenever additional data is embedded in the header portion, the additional data may be embedded in the image data.

FIG. 25 is a block diagram showing the configuration of an image processing apparatus according to a fourth embodiment of the present invention. An image processing apparatus 80 according to the fourth embodiment comprises: an input/output unit 81 for inputting and outputting image data; an encrypting unit 82 for encrypting image data and additional data; a decrypting unit 83 for decrypting image data and additional data; a memory 84 for storing image data and additional data; an additional data recognition unit 85 for recognizing additional data embedded in image data by a given embedding method; an additional data embedding unit 86 for embedding additional data in image data; and a control unit 87 for controlling the overall apparatus, which are mutually connected through a bus line 88.

Next, a description will be made of the operation of the image processing apparatus 80 according to the above-described configuration that judges whether or not first additional data is embedded in image data sent from a personal computer, and performs processing based on the judgment result before the data is output to a printer.

Image data sent and first additional data sent from a personal computer are stored in the memory 84 via the input/output unit 81. Upon termination of the input of the image data, the control unit 87 determines whether the image data stored in the memory 84 is encrypted, and if it is encrypted in proper cipher, directs the decrypting unit 83 to perform decryption processing and the additional data embedding unit 86 to embed second additional data in the image data.

As a result, if the image data is encrypted, after the image data is decrypted and second additional data is embedded in the image data, it is output to a printer from the input/output unit 81. On the other hand, if the image data stored in the memory 84 is not encrypted, the control unit 87 outputs the image data to a printer from the input/output unit 81 without modification. A decryption key is set in advance in the decrypting unit 83. The decrypting unit 83 uses the decryption key to read the encrypted image data stored in the memory 84, decrypts the image data, and stores the decrypted image data and additional data in the memory 84.

Next, the control unit 87 adds, to the first additional data stored in the memory 84, encryption information indicating that the first additional data is input in an encrypted form. This is done to use the encryption information a way of judging whether to perform encryption again during scanning of images printed by a printer. Next, the image data stored in the memory 84 and the first additional data to which the encryption information is added are read into the additional data embedding unit 86.

In the additional data embedding unit 86, second additional data corresponding to the first additional data is embedded in the image data. As the additional data embedding unit 86, the same configuration used in FIG. 12 as that of the pattern type additional data embedding unit 36 of the second embodiment is used. The image data in which the second additional data is embedded is temporarily stored in the memory 84, and then is output to a printer from the input/output unit 81.

The operation of scanning in printed images will be described. Image data read from the scanner is input and is stored in the memory 84 via the input/output unit 81. Thereafter, the image data is input to the additional data recognition unit 85 to recognize second additional data. As the additional data recognition unit 85, the same configuration used in FIG. 15 as that of the pattern type additional data detection unit 35 of the second embodiment is used. The second additional data recognized in this way is stored in the additional data storage area of the memory 84.

Next, the control unit 87 checks the second additional data stored in the memory 84, and if encryption information is appended, judges that the scanned-in image data is a printed version of encrypted electronic image data, and commands that the scanned-in image data should be encrypted again. Specifically, the control unit 87 deletes the encryption information from the first additional data stored in the memory 84 and reads the image data and first additional data stored in the memory 84 into the encrypting unit 82, encrypts them using a preset encryption key, and then outputs them to the personal computer from the input/output unit 81.

As has been above, in the image processing apparatus 80 according to the fourth embodiment, if even encrypted image data is input, the image data is decrypted, and if first additional data is appended to the decrypted image data, second additional data is appended to output the image data, whereby additional information represented by the second additional data can be extracted without failure from formed images. Particularly, by appending, to the second additional data, encryption information indicating that the input image data is encrypted data, whether to perform reencryption processing or not can be easily judged simply by referencing the encryption information when printed-out images are scanned in.

As has been described above, according to the present invention, recognition processing is performed to judge whether or not first additional data representing additional information is appended to image data subject to image formation, image display, or image conversion, and if it is judged that it is appended, second additional data representing additional information that can be extracted from formed images, image display, or image conversion is appended, whereby the additional information can be extracted without failure from formed images, image display, or image conversion, regardless of whether the first additional data is appended.

What is claimed is:

1. An image processing apparatus, comprising:
   an additional data recognition part that recognizes that first additional data representing additional information is appended to image data from which to form images; and
   an appending part that, when it is recognized by said additional data recognition part that the first additional data is appended, appends second additional data representing additional information to said image data, wherein the additional information is extractable from formed images and unrecognizable to human eyes, and said second additional data is appended with a higher strength than said first additional data appended to said image data.

2. The image processing apparatus according to claim 1, wherein said appending part appends the second additional data by superimposing it in the image data.

3. The image processing apparatus according to claim 1, wherein said appending part appends the second additional data to the header portion attached to the image data.

4. The image processing apparatus according to claim 1, comprising:
   an image forming part that forms images based on the image data to which the second additional data is appended by said appending part.

5. The image processing apparatus according to claim 4, wherein said image forming part forms images based on the second additional data by an invisible image forming material.

6. The image processing apparatus according to claim 1, comprising:
an additional data deletion part that deletes from said image data first additional data recognized to be appended by said additional data recognition part.

7. The image processing apparatus according to claim 6, comprising:
an image quality judging part that judges whether said first additional data degrades the image quality of formed images; and
a deletion control part that, when it is judged by said image quality judging part that the image quality is degraded, operates said additional data deletion part.

8. An image processing apparatus according to claim 1, comprising:
an extraction judging part that judges whether additional information represented by the first additional data can be extracted from formed images; and
a prohibition part that, when it is judged by said extracting judging part that the additional information cannot be extracted, prohibits the appending operation of said appending part.

9. The image processing apparatus according to claim 1, comprising:
an additional information recognition part that recognizes additional information represented by said first additional data,
wherein said appending part appends at least part of the additional information recognized by said additional information recognition part.

10. The image processing apparatus according to claim 1, wherein said additional information is information for identifying the copyright holder of image data or images.

11. The image processing apparatus according to claim 1, wherein said additional information is information for identifying a local apparatus.

12. The image processing apparatus according to claim 1, wherein said additional information is information for identifying an operator who directed forming images from said image data.

13. The image processing apparatus according to claim 1, wherein said additional information is information for identifying a date and time when the second additional data was appended by said appending part.

14. The image processing apparatus according to claim 1, wherein said additional data recognition part recognizes, from information indicating that said first additional data is appended, that said first additional data is appended.

15. The image processing apparatus according to claim 4, comprising:
an additional information recognition part that recognizes additional information represented by said first additional data; and
an image formation control part that, when additional information is not recognized by said additional information recognition part, prohibits image formation by said image forming part.

16. The image processing apparatus according to claim 1, wherein said appending part appends the second additional data by the same method for the first additional data appended to said image data.

17. The image processing apparatus according to claim 1, wherein said appending part appends the second additional data by a method suitable for said image forming part.

18. The image processing apparatus according to claim 1, wherein said image data and said first additional data are encrypted data, comprising a decrypting part that decrypts the encrypted image data,
wherein said appending part appends the second additional data to the image data decrypted by said decrypting part.

19. The image processing apparatus according to claim 18, wherein said appending part adds, to the second additional data, encryption information indicating that said first additional data is input in an encrypted form.

20. An image processing apparatus, comprising:
an additional data recognition part that recognizes that first additional data representing additional information is appended to image data from which to convert images; and
an appending part that, when it is recognized by said additional data recognition part that the first additional data is appended, appends, to said image data, second additional data representing additional information extractable from an image from image conversion, wherein said second additional data is appended with a higher strength than said first additional data appended to said image data.

21. An image processing apparatus, comprising:
an additional data recognition part that recognizes that first additional data representing additional information is appended to image data from which to display images; and
an appending part that, when it is recognized by said additional data recognition part that the first additional data is appended, appends second additional data representing additional information to said image data, wherein the additional information is extractable from a displayed image and unrecognizable to human eyes, and said second additional data is appended with a higher strength than said first additional data appended to said image data.

22. An image processing method, comprising the steps of:
judging whether first additional data representing additional information is appended to image data from which to form images; and
on judging that said first additional data is appended, appending second additional data representing additional information to said image data, wherein the additional information is extractable from formed images and unrecognizable to human eyes, and said second additional data is appended with a higher strength than said first additional data appended to said image data.

23. An image processing method, comprising the steps of:
judging whether first additional data representing additional information is appended to image data from which to convert images; and
on judging that said first additional data is appended, appending second additional data representing additional information to said image data, wherein the additional information is extractable from converted images and unrecognizable to human eyes, and said second additional data is appended with a higher strength than said first additional data.

24. An image processing apparatus, comprising:
an additional data recognition part that recognizes that first additional data representing additional information is appended to image data, by a first embedding method, from which to form images; and an appending part that, when it is recognized by said additional data recognition part that the first additional data is appended, appends second additional data representing additional information to said image data by a second embedding method, wherein the additional information is extractable from formed images, and said second additional data is appended with a higher strength than said first additional data appended to said image data.

25. The image processing apparatus according to claim 24, comprising:

an additional information recognition part that recognizes additional information represented by said first additional data, wherein said appending part appends at least part of the additional information recognized by said additional information recognition part.

26. An image processing apparatus, comprising:

an additional data recognition part that recognizes that first additional data representing additional information is appended to image data, by a first embedding method, of an image data to be converted; and an appending part that, when it is recognized by said additional data recognition part that the first additional data is appended, appends, second additional data representing additional information to said image data, the additional information extractable from an image generated by image conversion, wherein said second additional data is appended with a higher strength than said first additional data appended to said image data.

27. The image processing apparatus according to claim 26, comprising:

an additional information recognition part that recognizes additional information represented by said first additional data, wherein said appending part appends at least part of the additional information recognized by said additional information recognition part.

28. An image processing method comprising the steps of:

judging whether first additional data representing additional information is appended to image data, by a first embedding method, from which to form images; and on judging that said first additional data is appended, appending second additional data representing additional information to said image data by a second embedding method, wherein the additional information is extractable from formed images, and said second additional data is appended with a higher strength than said first additional data.

29. An image processing method, comprising the steps of:

judging whether first additional data representing additional information is appended to image data, by a first embedding method, convert which to form images; and on judging that said first additional data is appended, appending second additional data representing additional information to said image data by a second embedding method, wherein the additional information is extractable from converted images, and said second additional data is appended with a higher strength than said first additional data.

* * * * *